(12) United States Patent
Kishi et al.

(10) Patent No.: US 10,339,084 B2
(45) Date of Patent: Jul. 2, 2019

(54) COMMUNICATION SYSTEM, MANAGEMENT APPARATUS, AND CONTROLLING APPARATUS

(71) Applicant: FUJITSU LIMITED, Kawasaki-shi, Kanagawa (JP)

(72) Inventors: Yusuke Kishi, Kahoku (JP); Toshio Iga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 230 days.

(21) Appl. No.: 14/967,487

(22) Filed: Dec. 14, 2015

(65) Prior Publication Data

US 2016/0179723 A1 Jun. 23, 2016

(30) Foreign Application Priority Data

Dec. 22, 2014 (JP) ................................ 2014-258588

(51) Int. Cl.
*G06F 13/366* (2006.01)
*G06F 13/40* (2006.01)

(52) U.S. Cl.
CPC ........ *G06F 13/366* (2013.01); *G06F 13/4068* (2013.01)

(58) Field of Classification Search
CPC ........................... G06F 13/366; G06F 13/4068
USPC .......................................................... 710/38
See application file for complete search history.

(56) References Cited

U.S. PATENT DOCUMENTS

| | | | |
|---|---|---|---|
| 8,745,283 B1 * | 6/2014 | Talbert | H04L 43/50 710/15 |
| 2004/0264382 A1 * | 12/2004 | Lackshminarasimha | H04L 41/0853 370/252 |
| 2008/0313366 A1 * | 12/2008 | Sagi | G06F 11/004 710/38 |

FOREIGN PATENT DOCUMENTS

| | | | |
|---|---|---|---|
| JP | H08-153017 | 6/1996 | |
| JP | H1048279 | * 2/1998 | ............. G01R 31/02 |
| JP | 2009-104351 | 5/2009 | |

OTHER PUBLICATIONS

Japanese Office Action dated Jul. 31, 2018 for corresponding Japanese Patent Application No. 2014-258588, with Partial English Translation, 8 pages.

* cited by examiner

*Primary Examiner* — Idriss N Alrobaye
*Assistant Examiner* — Ronald T Modo
(74) *Attorney, Agent, or Firm* — Fujitsu Patent Center

(57) ABSTRACT

A communication system includes a communication apparatus comprising a plurality of first connectors; a controlling apparatus that comprises a plurality of second connectors; a first gathering unit that gathers first identifiers for the respective communication cables coupled to the plurality of first connectors of the communication apparatus; a second gathering unit that gathers second identifiers for the respective communication cables coupled to the plurality of second connectors of the controlling apparatus; and a connection normality determining unit that determines whether or not the communication cables that connect between the controlling apparatus and the communication apparatus are connected properly, by comparing the first identifiers with the second identifiers.

10 Claims, 27 Drawing Sheets

FIG. 4

| FRT No. | PORT NO. | COUPLING STATUS | S/N |
|---|---|---|---|
| FRT0 | Port0 | COUPLED | 1234567890 |
| FRT0 | Port1 | COUPLED | 1234567891 |
| FRT0 | Port2 | COUPLED | 1234567892 |
| ... | ... | ... | ... |
| FRT1 | Port0 | COUPLED | ABCDEFGHI |
| FRT1 | Port1 | COUPLED | BBCDEFGHI |
| FRT1 | Port2 | COUPLED | CBCDEFGHI |
| ... | ... | ... | ... |
| FRT2 | Port0 | UNCOUPLED | — |
| FRT2 | Port1 | UNCOUPLED | — |
| FRT2 | Port2 | UNCOUPLED | — |
| ... | ... | ... | ... |
| FRT3 | Port0 | COUPLED | abcde12345 |
| FRT3 | Port1 | COUPLED | abcde12346 |
| FRT3 | Port2 | COUPLED | abcde12347 |
| ... | ... | ... | ... |

341

| PORT NO. | COUPLING STATUS | S/N |
|---|---|---|
| Port0 | COUPLED | 1234567890 |
| Port1 | COUPLED | ABCDEFGHI |
| Port2 | UNCOUPLED | -- |
| Port3 | UNCOUPLED | -- |

| FRT NO. | CONNECTOR NO. | S/N |
|---|---|---|
| 0 | 0 | 1234 |
| 0 | 1 | (NONE) |
| 0 | 2 | (NONE) |
| 0 | 3 | 2234 |
| 1 | 0 | 1345 |
| 1 | 1 | 3345 |
| 1 | 2 | 3567 |
| 1 | 3 | 2345 |
| 2 | 0 | 1456 |
| 2 | 1 | 3456 |
| 2 | 2 | (NONE) |
| 2 | 3 | 2456 |
| 3 | 0 | 1567 |
| 3 | 1 | (NONE) |
| 3 | 2 | 3234 |
| 3 | 3 | 2567 |

341a

| CM NO. | CM CONNECTOR NO. | FRT | FRT CONNECTOR NO. |
|---|---|---|---|
| 1 | 0 | 0 | 3 |
| 1 | 1 | 1 | 3 |
| 1 | 2 | 2 | 3 |
| 1 | 3 | 3 | 3 |
| 2 | 1 | 2 | 1 |
| 2 | 2 | 1 | 2 |

343 (233)

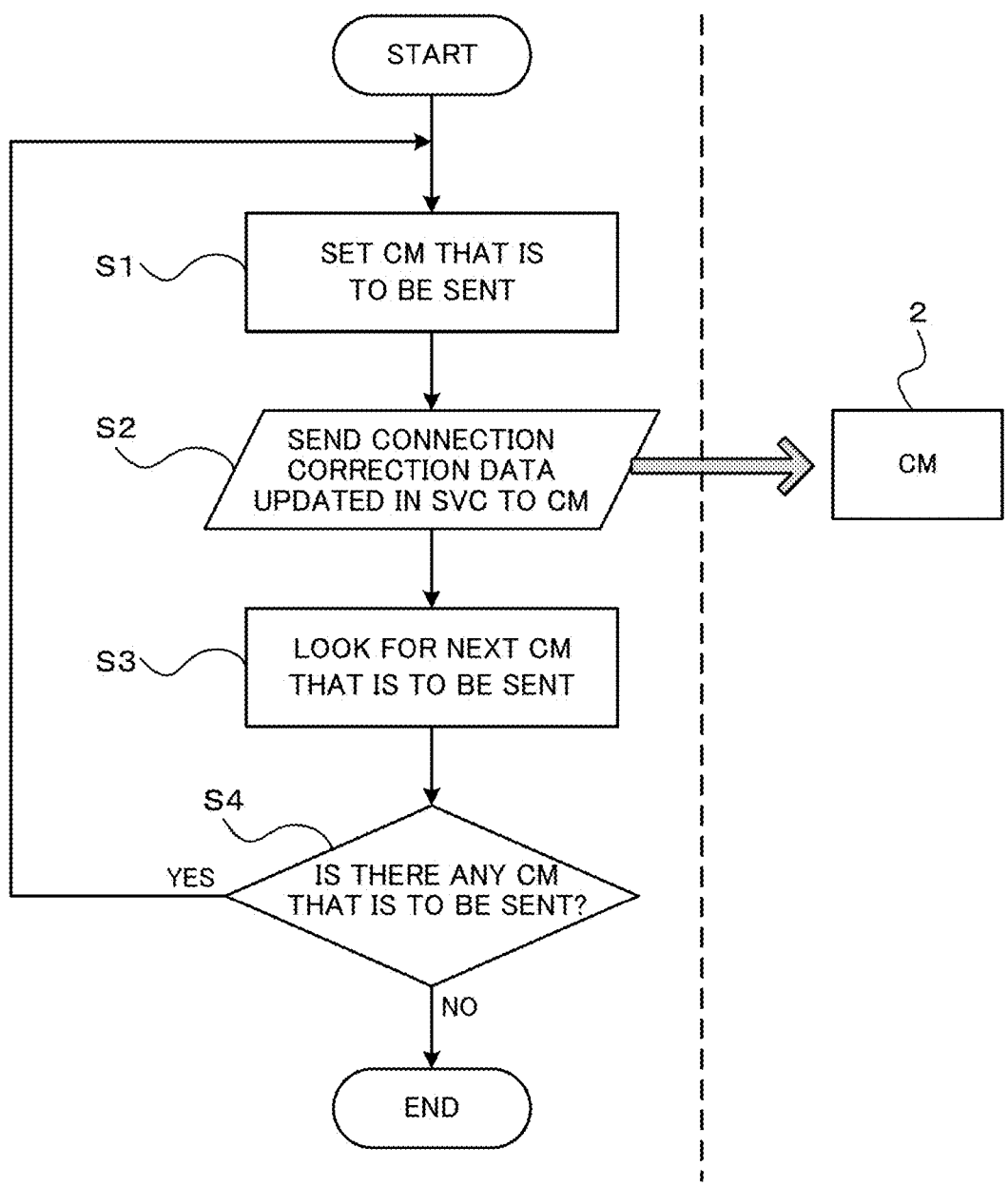

COMMUNICATION SYSTEM, MANAGEMENT APPARATUS, AND CONTROLLING APPARATUS

CROSS-REFERENCE TO RELATED APPLICATION

This application is based upon and claims the benefit of priority of the prior Japanese Patent application No. 2014-258588, filed on Dec. 22, 2014, the entire contents of which are incorporated herein by reference.

FIELD

The embodiments discussed herein are directed to a communication system, a management apparatus, and a controlling apparatus.

BACKGROUND

In a redundant arrays of inexpensive disks (RAID) apparatus, for example, data is transmitted through cables using various buses. Most of buses (cable buses) used for cable transmissions are designed in accordance with standards that are stipulated for cable transmissions. Hence, devices connected through a cable can determine their own locations in the connections by exchanging Slot IDs, for example.

On the contrary, only a limited number multi-purpose central processing units (CPUs) directly support cable buses. Thus, a controller device that converts the Peripheral Component Interconnect Express (PCIe) supported by multi-purpose CPUs to cable buses is provided to a controller module (CM).

In such conventional RAID apparatuses, simply providing a controller device that carries out the above conversion from the PCIe into cable buses to a CM increases the production costs and results in a reduction in the performance.

To avoid such issues, direct cabling of PCIe is considered, without providing a controller device.
Patent Document1: Japanese Laid-Open Patent Publication No. 2009-104351
Patent Document2: Japanese Laid-Open Patent Publication No. 8-153017

However, for direct cabling between PCIe devices, it is required to determine whether devices are properly connected.

SUMMARY

Thus, according to an aspect of the embodiments, a communication system includes a communication apparatus comprising a plurality of first connectors; a controlling apparatus that comprises a plurality of second connectors and is connected to the communication apparatus through a plurality of communication cables; a first gathering unit that gathers first identifiers for the respective communication cables coupled to the plurality of first connectors of the communication apparatus; a second gathering unit that gathers second identifiers for the respective communication cables coupled to the plurality of second connectors of the controlling apparatus; and a connection normality determining unit that determines whether or not the communication cables that connect between the controlling apparatus and the communication apparatus are connected properly, by comparing the first identifiers with the second identifiers.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of FRT connector information in the storage apparatus as one example of the first embodiment;

FIG. 18 is a diagram illustrating an example of FRT connector information in the storage apparatus as one example of the second embodiment;

FIG. 27 is a flowchart illustrating processing by a connection correction data sending unit in the SVC in the storage apparatus as one example of the second embodiment.

DESCRIPTION OF EMBODIMENTS

Hereinafter, embodiments of a communication system, a management apparatus, and a controlling apparatus will be described with reference to the drawings. Note that the embodiments below are described by way of example only, and various modifications and applications of techniques that are not described explicitly in the embodiments illustrated below are not intended to be excluded. In other words, various modifications of the embodiment may be implemented (e.g., combining embodiments and modifications) without departing from the spirit of the embodiment. Furthermore, it is not intended that the drawings illustrate only elements depicted therein, and may include other functions and the like.

(A) First Embodiment (a) Configuration

Figure 1:
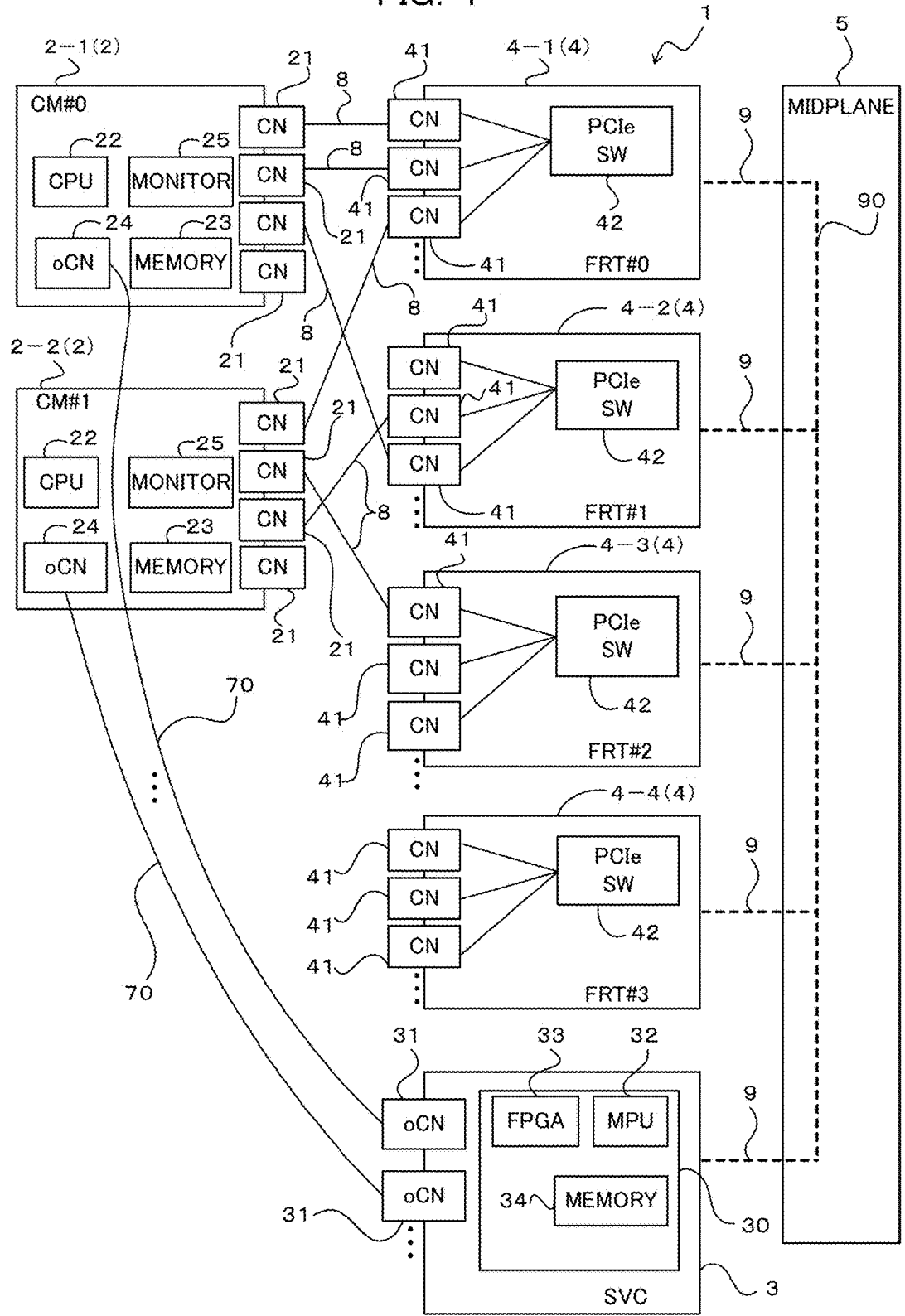
FIG. 1 is a diagram illustrating a cable connection configuration in a storage apparatus as one example of a first embodiment.

FIG. 1 is a diagram illustrating a cable connection configuration in a storage apparatus 1 as one example of a first embodiment.

In the example depicted in FIG. 1, the storage apparatus 1 includes a service processor (hereinafter referred to as "SVC") 3, a midplane 5, multiple (two are illustrated in FIG. 1) controller modules (hereinafter referred to as "CMs") 2 and four front-end routers (hereinafter referred to as "FRTs") 4-1 to 4-4.

An example in which the multiple CMs 2 and the multiple FRTs 4-1 to 4-4 are connected with PCIe communication cables 8 in such a storage apparatus 1, will be described.

The midplane 5 is a circuit board apparatus that performs data communications among devices, and includes multiple connectors (not illustrated) and performs bus communications among devices connected to these connectors.

In the example depicted in FIG. 1, the SVC 3 and the four FRTs 4-1 to 4-4 are connected to the midplane 5.

The FRTs 4-1 to 4-4 are communication apparatuses that enable communications among the multiple CMs 2 (inter-CM communications). The FRTs 4-1 to 4-4 have similar configurations.

Note that, hereinafter, the FRT 4-1 may also be referred to as FRT #0. Similarly, the FRT 4-2, the FRT 4-3, and the FRT 4-4 may also be referred to as FRT #1, FRT #2, and FRT #3, respectively.

Note that, hereinafter, the reference symbols 4-1 to 4-4 are used for referring to a specific FRT while reference symbol 4 is used when reference is made to any of the multiple FRTs.

Furthermore, hereinafter, the reference symbols 2-1 and 2-2 are used for referring to a specific CM while reference symbol 2 is used when reference is made to any of the multiple CMs.

Each FRT 4 includes a PCIe switch (PCIe SW) 42 and multiple (e.g., 24) connectors (first connectors) 41. Note that a part of the connectors 41 are illustrated in each FRT 4 for the sake of brevity in FIG. 1.

To each connector 41, a connector (not illustrated) that is attached to one end of a PCIe communication cable (hereinafter, simply referred to as "communication cable") 8 is detachably coupled. For example, if the connector of the communication cable 8 is a male connector, the connector 41 is a female connector.

A connector (not illustrated) that is attached to the other end of the communication cable 8 is coupled to a connector (described later) of the CM 2-1 or 2-2.

Hereinafter, the situation where the connectors of the communication cables 8 are attached to the connectors 41 or the connectors 21 is referred to as coupled (mounted), and the situation where the connectors of the communication cables 8 are not attached to the connectors 41 or the connectors 21 is referred to as uncoupled (unmounted).

The situation where the connectors of the communication cables 8 are physically inserted to the connectors 41 of the FRTs 4 or the connectors 21 of the CMs 2 is referred to as the "coupled status". The situation where the connectors of the communication cables 8 are inserted to the connectors 41 of the FRTs 4 or the connectors 21 of the CMs 2 so as to be electrically communicative with each other is referred to as the "connected status".

Each FRT 4 is connected to all CMs 2 through the communication cables 8. Specifically, each CM 2 is connected to all FRTs 4 through the communication cables 8.

Read only memories (ROMs) are provided to the connectors at the both ends of each communication cable 8 and the same serial number (S/N) is stored in the ROMs as the identifier. The FRTs 4 and the CMs 2 can read and obtain the serial number from these ROMs.

Each FRT 4 includes a programmable logic device (PLD) which is not illustrated. The PLD checks whether or not a communication cable 8 is coupled to each connector 41, and stores, in a storage area (not illustrated), the information as to whether or not a communication cable 8 is coupled, for each connector 41.

The PCIe switch 42 is a circuit device that switches among data communication pathways, and in response to data being entered to the connector 41, makes the data to be output from another connector 41 or the like, depending on the sender (communication counterpart) of the data.

In addition, each FRT 4 is connected to the SVC 3 through a data bus 9 and the midplane 5. Hereinafter, the data communication paths that connect the respective FRTs 4 and SVCs 3 through these data buses 9 and the midplane 5 may also be referred to as a first data bus 90.

Each SVC 3 is a monitor apparatus that performs various types of monitoring in the storage apparatus 1, and the SVC 3 communicates with each CM 2 to gather error state information into an error log, for example.

Each SVC 3 also functions as a managing apparatus that manages communications among the CMs 2 and the FRTs 4, and realizes a cable connection normality determination function for determining normality of connections between the CMs 2 and the FRTs 4 through the communication cables 8, in cooperation with the CMs 2, as will be described later.

As depicted in FIG. 1, the SVC 3 includes a monitor device 30 and multiple (two are illustrated in the example depicted in FIG. 1) connectors (oCNs) 31. A connector at one end of the monitor interface cable 70 (not illustrated) is detachably coupled to each connector 31. A connector (not illustrated) at the other end of the monitor interface cable 70 is coupled to a connector (oCN) 24 provided to each CM 2, such that the SVC 3 is communicatively connected to respective CMs 2 through the monitor interface cables 70 to monitor the respective CMs 2.

While two of the CMs 2 and the connectors 31 are illustrated in the example depicted in FIG. 1 for the sake of brevity, three or more (e.g., 24) of CMs 2 and connectors 31 may be provided and various modifications may be made.

Figure 2:
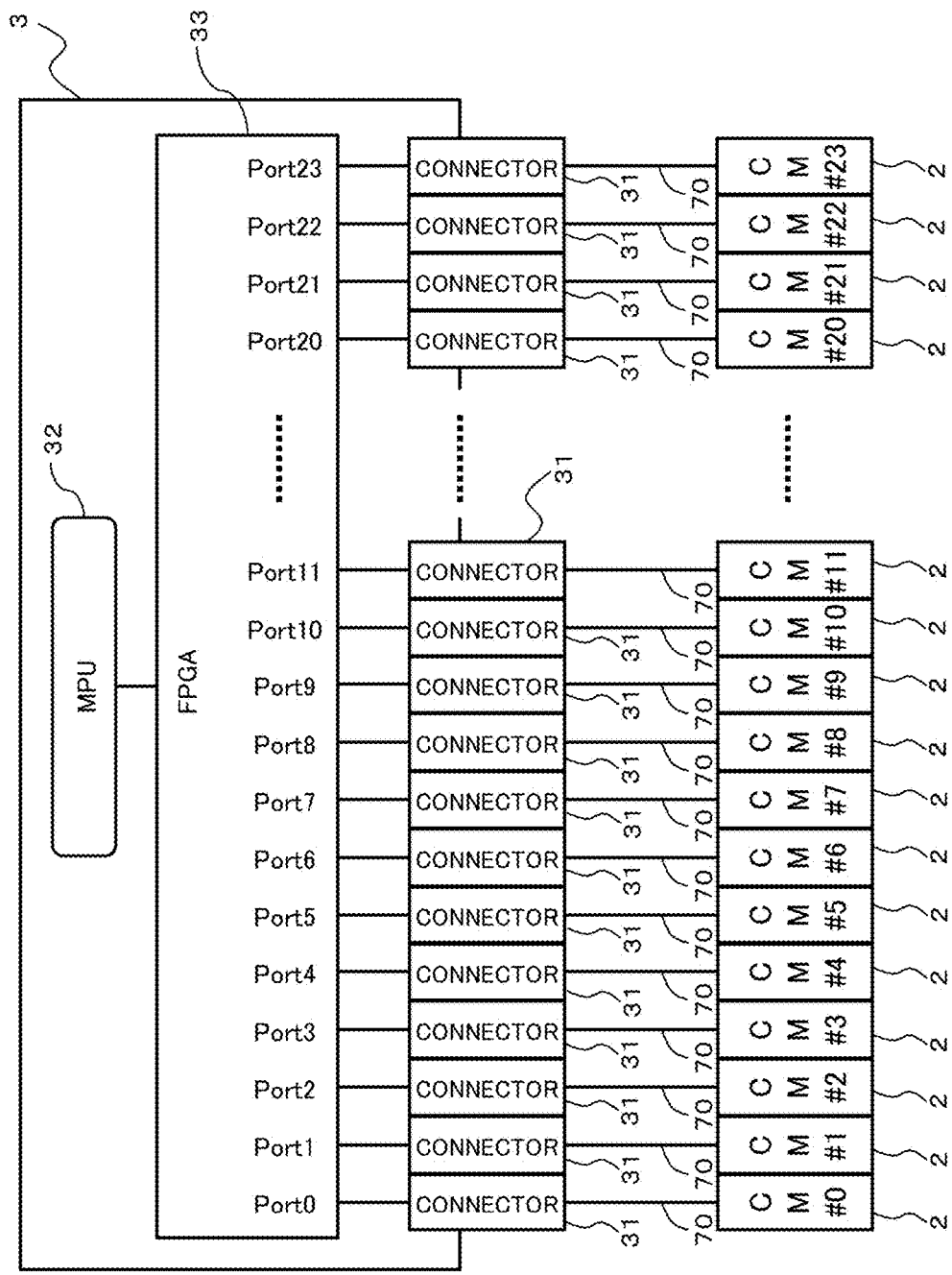
FIG. 2 is a diagram illustrating the connection configuration among SVC and CMs in the storage apparatus as one example of the first embodiment.

FIG. 2 is a diagram illustrating the connection configuration of the SVC 3 and the CMs 2. In the example depicted in FIG. 2, 24 connectors 31 are provided to the SVC 3, and the respective CMs 2 are connected to the connectors 31 through the respective monitor interface cables 70.

The monitor device 30 includes a micro-processing unit (MPU) 32, a field programmable gate array (FPGA) 33, and a memory 34.

The FPGA 33 is an integrated circuit of, a circuit configuration of which is rewritable, and a single connector 31 is connected to each of multiple (e.g., 24) ports provided to the FPGA 33. Hereinafter, for the sake of brevity, the connectors 31 in the SVC 3 and ports are used interchangeably.

The memory 34 is a storage memory including a ROM and a random access memory (RAM). A software program and data for that program for realizing the monitor function and the cable connection normality determination function of the SVC 3 are written into the ROM in the memory 34. The software program in the memory 34 is suitably read into the MPU 32 and executed thereon. Furthermore, the RAM in the memory 34 is used as a primary storage memory or a working memory.

The MPU 32 is a processing apparatus that performs various types of controls and computations, and realizes various functions by executing an operating system (OS) and programs stored in the memory 34.

Figure 3:
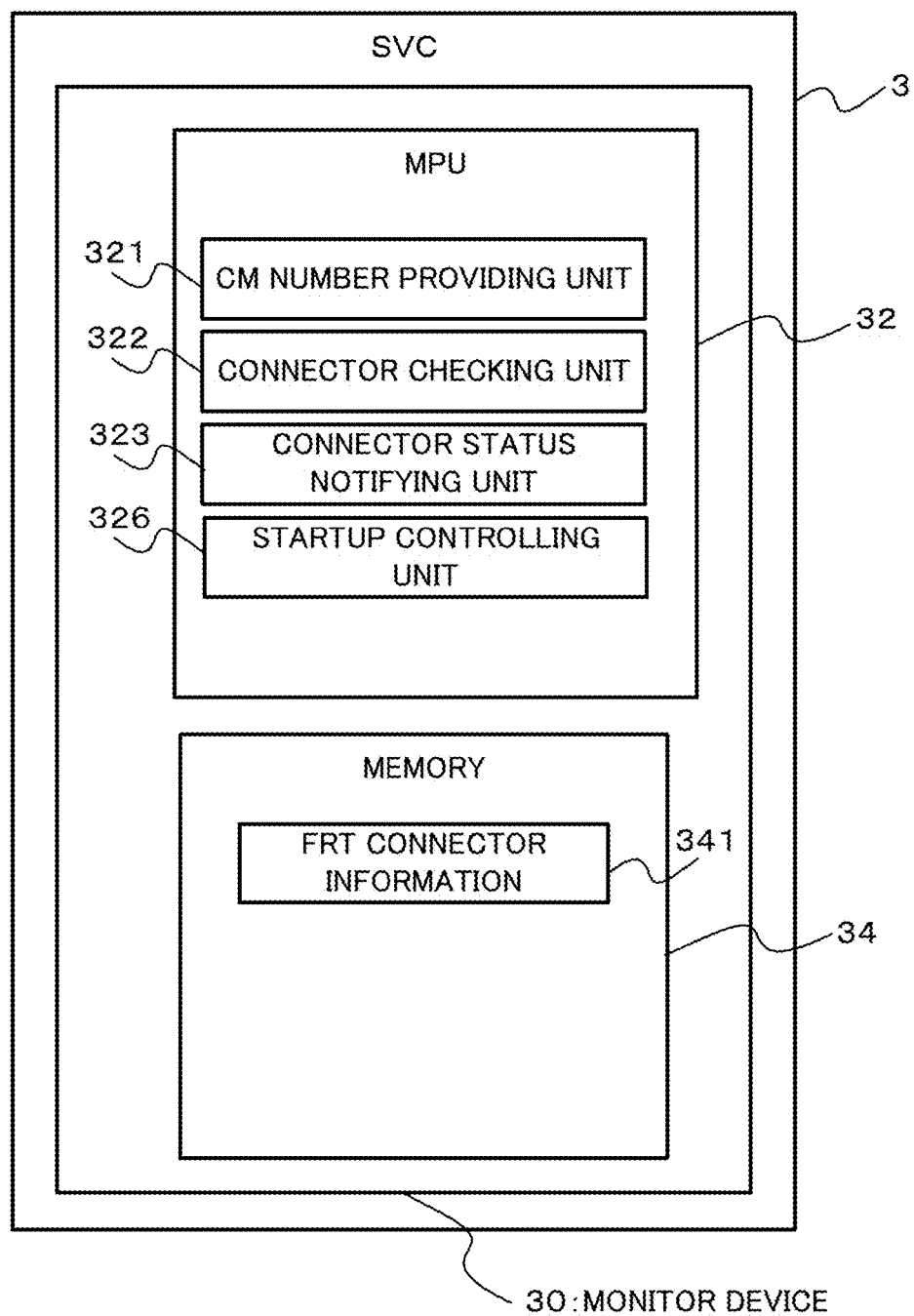
FIG. 3 is a diagram depicting the functional configuration of the SVC in the storage apparatus as one example of the first embodiment.

FIG. 3 is a diagram depicting the functional configuration of the SVC 3 in the storage apparatus 1 as one example of the first embodiment.

As depicted in FIG. 3, the MPU 32 includes functions as a CM number providing unit 321, a connector checking unit 322, a connector status notifying unit 323, and a startup controlling unit 326.

The MPU 32 functions as the CM number providing unit 321, the connector checking unit 322, the connector status notifying unit 323, and the startup controlling unit 326, by executing programs stored in the memory 34 and the like.

The CM number providing unit 321 sets apparatus identifiers to the CMs 2 connected to the SVC 3, for identifying the CMs 2, and functions as an apparatus identifier setting unit.

An apparatus identifier is set in accordance with a port number n (n is a natural number of zero or greater) that identifies each port in the FPGA 33 provided to the monitor device 30 in the SVC 3. In the present embodiment, an integer n (n is a natural number of zero or greater) that equals to a port number n is used as an apparatus identifier, for example. Hereinafter, apparatus identifiers set by the CM number providing unit 321 may also be referred to as CM numbers.

A CM number inquiry is entered to the SVC 3 from the CM number recognizing unit 221 (described later) in a CM 2, through the monitor interface cable 70.

For example, the relationships between connectors 31 (ports) and corresponding CMs 2 to be connected are determined in advance as a specification, and such relationships are stored in the memory 34 or the like, as CM number matching information.

In response to a signal of a CM number inquiry being entered to the connector 31 (port) from a CM 2, the CM number providing unit 321 identifies the port number of the FPGA 33 which is connected to the CM 2 that has sent the CM number inquiry, and identifies the CM 2 that has entered the CM number inquiry as an interrupt signal, by looking up the CM number matching information, based on that port number.

The CM number providing unit 321 then responds to (notifies) the CM 2 that has sent the CM number inquiry, with (of) the identified CM number (CM number notification), via the connector 31, the monitor interface cable 70, and the connector 24.

The connector checking unit 322 gathers information on connections with the communication cables 8 at each of the connectors 41, for each of the FRTs 4. Specifically, the connector checking unit 322 collects, from each FRT 4, two types of information, namely, presence or absence of coupling and the serial number (S/N), for respective connectors 41 in each FRT 4, via the first data bus 90.

The presence or absence of coupling indicates whether or not a communication cable 8 is coupled to that connector 41. Specifically, the presence or absence of coupling is information assuming a value of either "coupled" or "uncoupled". Hereinafter, the presence or absence of coupling may also be referred to as the "coupled status". In addition, information indicating the coupled status of a communication cable 8 at a connector 41 may also be referred to as "coupled status information".

For example, when a connector of a communication cable 8 is attached to a connector 41 of an FRT 4, a signal indicating the coupled status is entered to the monitor device 30 in the FPGA 33 of the SVC 3, and a flag is set to that register.

When the storage apparatus 1 is started up or an operation thereof is initiated or in the other situations, a PLD (not illustrated) provided to the monitor device 30 gathers coupled statuses of the respective connectors 41 of the FRTs 4 by reading values of the flags in the FPGA 33. The connector checking unit 322 gathers coupled status information by reading these coupled statuses gathered by the PLD.

The serial number is a serial number that is registered in a ROM in the communication cable 8 coupled to the connector 41.

The connector checking unit 322 reads the serial number of a communication cable 8 that is connected to a connector 41, from the connector 41 in the FRT 4 via the first data bus 90.

Note that the particular method to obtain serial numbers may be suitably varied. For example, the PLD provided to the FRT 4 may gather the serial number and store the serial number into a storage area, such as an unillustrated register, and the connector checking unit 322 may obtain the serial number by reading the information stored in the storage area.

The coupled status information and the serial number gathered by the connector checking unit 322 are stored in a predetermined area in the memory 34 as FRT connector information 341, while being related to information for identifying the connector 41 to which the communication cable 8 is coupled.

FIG. 4 is a diagram illustrating an example of the FRT connector information 341 in the storage apparatus 1 as one example of the first embodiment. In the example depicted in FIG. 4, the FRT connector information 341 is illustrated in a table format, for the sake of brevity.

The FRT connector information 341 depicted in FIG. 4 includes an FRT No., a port No., a coupled status, and a serial number (S/N), which are related to each other, as entries.

The FRT No. is an identifier for identifying an FRT 4, and "FRT0", "FRT1", "FRT2", and "FRT3" represent FRT #0, FRT #1, FRT #2, FRT #3, respectively, for example.

The port No. is an identifier for identifying a connector 41 (port) in the FRT 4, and "Port0", "Port1", and "Port2" correspond to the connectors 41 connected to Port0, Port1, and Port2 provided to the FRT 4, respectively, for example.

The coupled status and the serial number (S/N) are information gathered by the connector checking unit 322.

Accordingly, the first entry in the table depicted in the example in FIG. 4, for example, indicates that the communication cable 8 with a serial number of "1234567890" is coupled to the connector 41 of Port0 of FRT #0.

In this manner, the connector checking unit 322 functions as a first gathering unit that gathers the coupled status indicating the coupled status of the communication cable 8 (first connected status information), and the serial number of the communication cable 8 that is connected to the connector (first identifier), for connectors 41 of each of the FRTs 4.

Note that, in the storage apparatus 1, the relationship between the connectors 21 (ports) in the CMs 2 and the connectors (ports) 41 of the FRTs 4 connected thereto are defined in advance as the apparatus specifications. Accordingly, for a particular CM 2, the coupled status and the serial number of the connector 41 (port) of the FRT 4 that is to be connected to the connector 21 in the CM 2 can be obtained by looking up the FRT connector information 341.

The connector status notifying unit (first notifying unit) 323 notifies the CM 2 of the FRT connector information 341 (the coupled status and the serial number of the communication cable 8) gathered by the connector checking unit 322 as described above.

The connector status notifying unit 323, in response to receiving, from a CM 2, a port status information request to which the CM number of that CM 2 is set, i.e., to which the CM number is included, as will be described later, looks up the FRT connector information 341 based on the received CM number. The connector status notifying unit 323 then reads, from the FRT connector information 341, the coupled status and the serial number of the port corresponding to the CM 2 of the received CM number. Hereinafter, the coupled status and the serial number of the port corresponding to the CM 2, which are read from the FRT connector information 341, may also be referred to as port status information.

The connector checking unit 322 sends, the port status information, back to the CM 2 which has sent the port status information request.

When a serial number corresponding to the connector 41 has not been registered in the FRT connector information 341, the connector status notifying unit 323 sends information indicating uncoupled (certain code), back to the originator CM 2.

As described above, the connector status notifying unit 323 functions as a notifying unit that notifies the CM 2 of the coupled status (first connected status information) and the serial number (first identifier) gathered by the connector checking unit 322.

The startup controlling unit 326 performs a control to start the storage apparatus 1, and performs a control, such as power on and the like to parts provided to the storage apparatus 1, for example.

In addition, the startup controlling unit 326 starts the storage apparatus 1 when connection normal notifications are received from the connection normality determining units 223 (described later) in a certain number or more of CMs 2 in the storage apparatus 1. If connection normal notifications are not received from the certain number or more of CMs 2, the startup controlling unit 326 stops start of the storage apparatus 1.

Each of the CMs 2 performs a various types of controls in the storage apparatus 1, such as access controls to storage apparatus, such as an unillustrated hard disk drive (HDD), in accordance with a storage access request from a host apparatus (not illustrated). The CMs 2 have similar configurations.

Furthermore, each of the CMs 2 realizes a cable connection normality determination function that determines whether or not connections with the FRTs 4 through the communication cables 8 are normal, in cooperation with the SVC 3 described above.

Each of the CMs 2 illustrated in FIG. 1 includes a CPU 22, a memory 23, a connector 24, a monitor device 25, and multiple (four, in the example depicted in FIG. 1) connectors 11.

A connector at one end of the communication cable 8 is detachably coupled to the connector 21. For example, if the connector of the communication cable 8 is a male connector, the connector 21 is a female connector.

In addition, a connector at the other end of the communication cable 8 is coupled to a connector 41 of an FRT 4 described above. Each CM 2 is connected to all FRTs 4 through the communication cables 8.

One end of the monitor interface cable 70 is detachably coupled to the connector 24. The other end of the monitor interface cable 70 is coupled to a connector 31 provided to the SVC 3, thereby communicatively connecting the CM 2 to the SVC 3 through a monitor interface cable 70.

The monitor device 25 is connected to each connector 21 in the same CM 2 through the data bus, and monitors the respective connected statuses of the communication cables 8 at the connectors 21 and reads the serial numbers from the ROMs of the connected communication cables 8.

The monitor device 25 includes an MPU and an FPGA, neither of which is not illustrated, for example, and gathers the respective coupled statuses of the communication cables 8 at the connectors 21, using the FPGA, as well as gathers the serial numbers of the communication cables 8, using the MPU.

Note that the configuration of the monitor device 25 is not limited to the above-described one, and various modifications may be made. For example, the function as the monitor device 25 may be embodied by the CPU 22 by executing a program.

Hereinafter, information indicating the coupled status of a communication cable 8 at a connector 21 may also be referred to as coupled status information.

The coupled status information and serial numbers obtained by the monitor device 25 are stored in a storage area, e.g., an unillustrated register.

In addition, the monitor device 25 is also communicatively connected to the CPU 22 through the data bus.

The memory 23 is a storage memory including a ROM and a RAM. The ROM in the memory 23 stores, a software program that realizes the monitor function and the cable connection normality determination function of the CM 2 and data for that program. The software program on the memory 23 is suitably read and executed by the CPU 22. Furthermore, the RAM in the memory 23 is used as a primary storage memory or a working memory.

In addition, the CM information 231 and the CM connector information 232 are stored in the RAM in the memory 23.

Figures 5A, 5B:
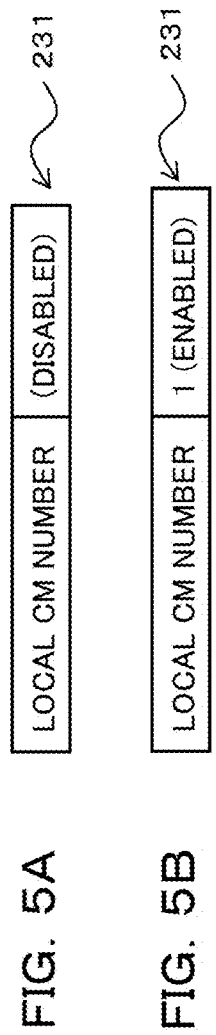
FIGS. 5A and 5B are diagrams illustrating CM information in the storage apparatus as one example of the first embodiment.

FIGS. 5A and 5B are diagrams illustrating the CM information 231 in the storage apparatus 1 as one example of the first embodiment. FIG. 5A illustrates the status before information is stored, and FIG. 5B illustrates the status after information is stored.

The CM information 231 stores a local CM number that is CM number of the local CM 2. The local CM number is information identifying the local CM 2 that is the CM 2 where the memory 23 is included, and specifically, is CM information notified (sent back) by the above-described CM number providing unit 321 in the SVC 3.

As depicted in FIG. 5A, before a CM number is notified from the CM number providing unit 321 in the SVC 3, the local CM number in the CM information 231 assumes a value of "invalid".

Then, once a CM number is notified from the CM number providing unit 321 in the SVC 3, as depicted in FIG. 5B, the notified value is set to the local CM number in the CM information 231 and the value is changed to "valid". FIG. 5B illustrates an example where a value of "1" is notified from the CM number providing unit 321 as the CM number of the local CM 2.

The CM connector information 232 is information about the respective communication cables 8 coupled to the connectors 21 provided to the CM 2. Specifically, similar to the FRT connector information 341, the CM connector information 232 includes two types of information: the presence or absence of coupling and the serial numbers of the respective connectors 21 provided to the CM 2.

Figure 6:
FIG. 6 is a diagram illustrating an example of CM connector information in the storage apparatus as one example of the first embodiment.

FIG. 6 is a diagram illustrating the CM connector information 232 in the storage apparatus 1 as one example of the first embodiment. Note that, in the example depicted in FIG. 6, the CM connector information 232 is illustrated in a table format, for the sake of brevity.

The CM connector information 232 depicted in FIG. 6 includes a port number, a coupled status, and a serial number (S/N), which are related to each other, as entries.

The port number is an identifier for identifying the connectors 21 (ports) in the CM 2, for example, and "Port0", "Port1", "Port2", and "Port3" correspond to the connectors 21 connected to Port0, Port1, Port2, Port3 provided to the CM 2, respectively.

The coupled status and the serial number (S/N) are information gathered by the connector checking unit 322.

Accordingly, for example, the first entry in the table depicted in FIG. 6, indicates that a communication cable 8 of a serial number "1234567890" is connected to the connector 21 at Port0 in the CM 2.

The CM connector information 232 is gathered by the connector checking unit 222 described later, and stored in a predetermined area in the memory 23.

The CPU 22 is a processing apparatus that performs various types of controls and computations, and realizes various functions by executing an OS and programs stored in the memory 23.

Figure 7:
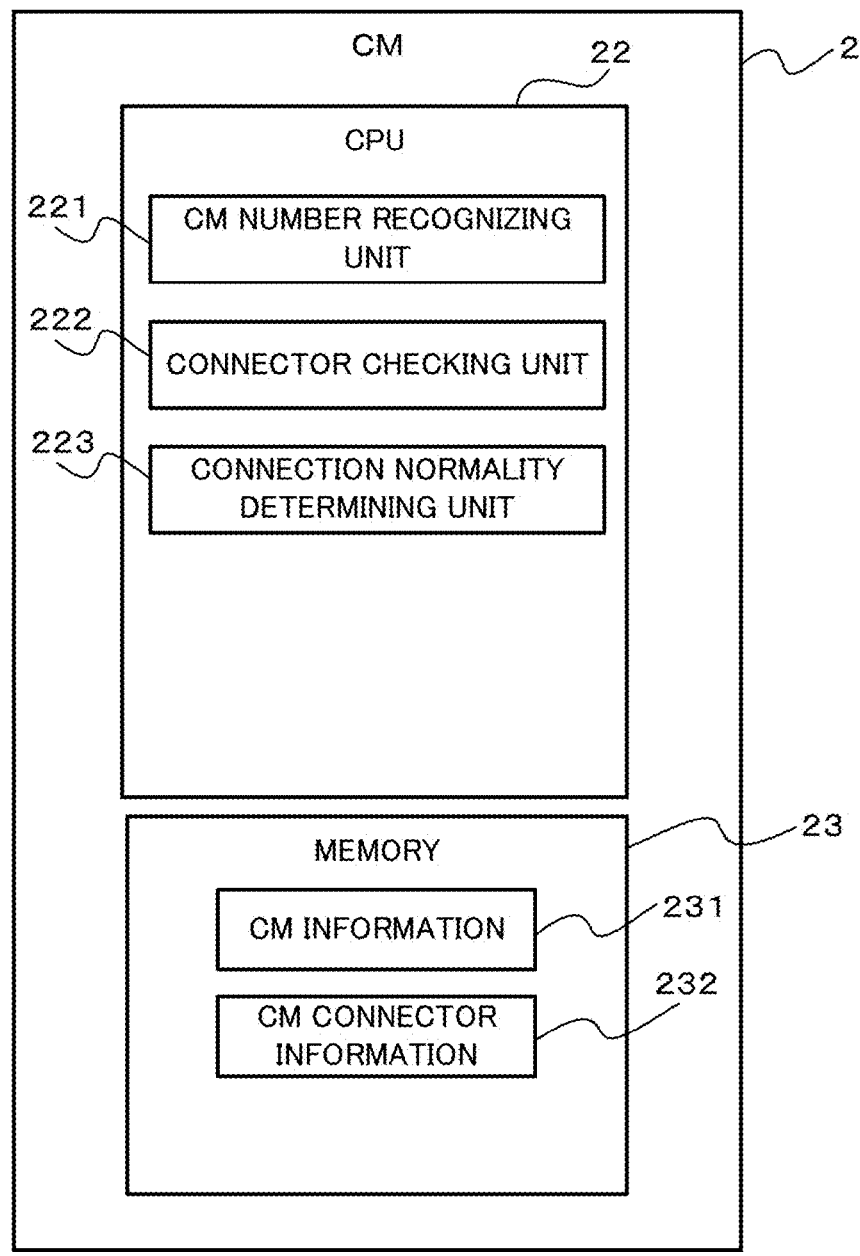
FIG. 7 is a diagram depicting the functional configuration of a CM in the storage apparatus as one example of the first embodiment.

FIG. 7 is a diagram depicting the functional configuration of a CM 2 in the storage apparatus 1 as one example of the first embodiment. As depicted in FIG. 7, the MPU 32 includes functions as a CM number recognizing unit 221, a connector checking unit 222, and a connection normality determining unit 223.

The CPU 22 functions as these CM number recognizing unit 221, the connector checking unit 222 and the connection normality determining unit 223, by executing a program stored in the memory 23 or the like.

The CM number recognizing unit 221 requests to inquire the CM number of the local CM 2, i.e., the CM 2 in which the CPU 22 executing the function as the CM number recognizing unit 221 is provided (CM number inquiry), by sending an obtainment request for the CM number (apparatus identifier) (CM number inquiry) to the SVC 3.

When the storage apparatus 1 is started up or an operation thereof is initiated or in the other situations, the CM number recognizing unit 221 requests a CM number inquiry to the SVC 3 through the monitor interface cable 70, for example.

In addition, this CM number inquiry from the CM 2 is made by entering an interrupt signal from the CM 2 to the SVC 3 via the connector 24, the monitor interface cable 70, and the connector 31, for example.

When the CM number providing unit 321 in the SVC 3 sends a CM number in response to this CM number inquiry, the CM number recognizing unit 221 receives the replied CM number and stores it in a predetermined area in the memory 23, as the CM information 231. Using the received CM number, the CM number recognizing unit 221 recognizes the CM number given to the local CM 2.

In addition, when the storage apparatus 1 is started up or an operation thereof is initiated or in the other situations, the CM number recognizing unit 221 notifies the SVC 3 of the initiation of the startup operation, through the monitor interface cable 70.

The connector checking unit 222 gathers information about coupling of the communication cables 8 coupled to the respective connectors 21 provided to the local CM 2. Specifically, the connector checking unit 222 collects the coupled status information and the serial number of each connector 21.

For example, the connector checking unit 222 reads the coupled status information and the serial number that are obtained by the monitor device 25 and stored in a register or the like. Note that the connector checking unit 222 (the CPU 22) may gather the coupled status information and the serial number from the connector 21, for example, and how such information is collected may be suitably varied.

The coupled status information and the serial number gathered by the connector checking unit 222 are stored in a predetermined area in the memory 23, as the CM connector information 232, while being related to information for identifying the connector 21 (refer to FIG. 6).

As described above, the connector checking unit 222 functions as a second gathering unit that gathers, for each connector 21 provided to the CM 2, a coupled status indicating the coupled status of the communication cable 8 (second connected status information), and the serial number (second identifier) of the communication cable 8 connected to the connector 21.

The connection normality determining unit 223 determines whether or not the communication cable 8 coupled to the connector 21 is properly connected to a connector 41 of an FRT 4. Specifically, the connection normality determining unit 223 determines whether or not connections between each connector 21 provided to the CM 2 and each connector 41 provided to the FRT 4 through the respective communication cables 8 are normal.

Specifically, the connection normality determining unit 223 sends a port status information request to the SVC 3, and obtains the coupled status information and the serial numbers of the respective connectors of the communication cables 8 coupled to the connectors 21 in the local CM 2, gathered by the connector checking unit 222. Thereby, for the respective connectors 41 in each FRT 4 to be connected to the corresponding connectors 21 provided to the local CM 2, the coupled status of the communication cables 8 and the serial numbers of the coupled communication cables 8 are obtained.

Note that the port status information request is sent from the CM 2 to the SVC 3 through the monitor interface cable 70, as an interrupt notification, for example.

A local CM number is set in the port status information request, and the connector status notifying unit 323 in the SVC 3 that has received port status information request can identify the originator CM 2 using this number and read the coupled status information and the serial number corresponding to the originator CM 2, from the FRT connector information 341.

When receiving the port status information from the connector status notifying unit 323 in the SVC 3, the connection normality determining unit 223 compares the port status information, i.e., the coupled status and the serial number detected at the FRT 4 managed in the SVC 3, with the coupled status information and the serial numbers gathered by the connector checking unit 222, of the connectors of the communication cables 8 connected to the respective connectors 21 in the local CM 2. In other words, the connection normality determining unit 223 checks whether or not the coupled status and the serial number managed in the SVC 3 match the coupled status and the serial number managed in the CM 2.

If the coupled statuses and the serial numbers match as a result of the inquiry, the connection normality determining unit 223 determines that the matched connector 21 is properly connected (no incorrect connection). Otherwise, any unmatched connector 21 is determined as not being properly connected (incorrect connection).

As described above, the connection normality determining unit 223 determines whether or not a connection is normal for each communication cable 8 connecting a CM 2 and an FRT 4, by comparing the coupled status and the serial number notified from the SVC 3, with the coupled status and the serial number gathered by the connector checking unit 322.

If an incorrect connection is determined, alerting processing, such as turning on warning light, e.g., a light emitting diode (LED), or outputting a message indicating that an incorrect connection is found on a display (not illustrated), for example. Based on the alert, a system administrator or any other users reconnects the communication cable 8 to proper connectors 41 and 21.

In addition, if no incorrect connection is determined, a notification indicating that the communication cable 8 is properly connected (connection normal notification) is sent to the SVC 3.

(b) Operations

Figure 8:
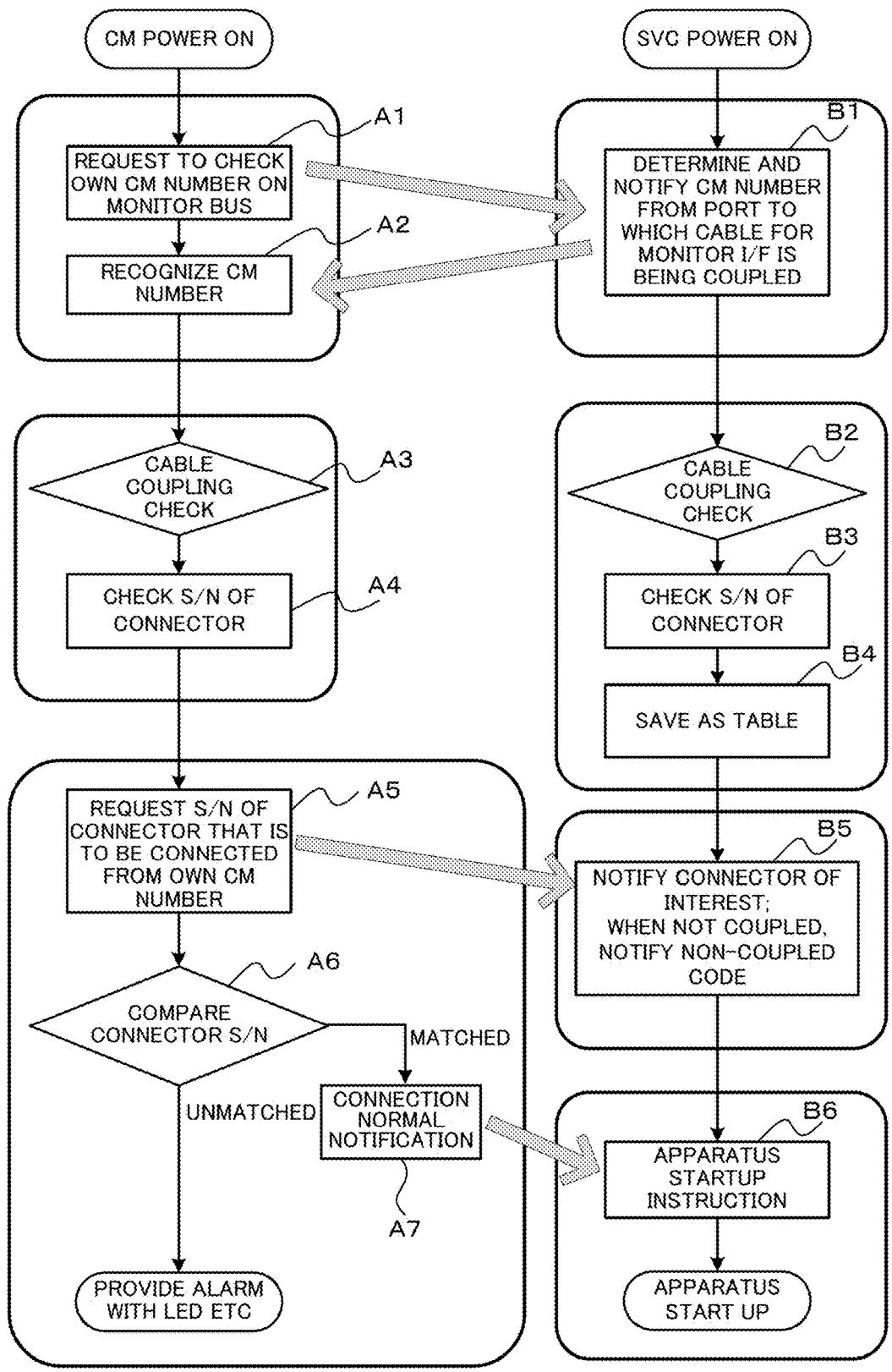
FIG. 8 is a flowchart illustrating an overview of processing by the storage apparatus as one example of the first embodiment.

An overview of processing by the storage apparatus 1 as one example of the first embodiment configured as described above will be described with reference to a flowchart (Steps A1-A7 and B1-B6) depicted in FIG. 8. Note that, in the flowchart depicted in FIG. 8, Steps A1-A7 indicate the processing in the CMs 2, while Steps B1-B6 indicate the processing in the SVC 3.

When the storage apparatus 1 is powered on, the power is supplied to the CMs 2 and the SVC 3.

In each CM 2, a CM number recognizing unit 221 requests the SVC 3 to check the CM number of the local CM 2 (Step A1).

Specifically, the CM number recognizing unit 221 sends a CM number inquiry to the SVC 3 via the connector 24, the monitor interface cable 70, and the connector 31.

In the SVC 3, the CM number providing unit 321 identifies the CM number, based on the port number of the FPGA 33 to which the CM 2 that has sent the CM number inquiry is connected, and responds to the CM 2 that has sent the CM number inquiry, with the CM number (Step B1). Note that the details of processing of the CM number providing unit 321 will be described later with reference to FIG. 12.

At the CM 2, the CM number recognizing unit 221 receives the CM number sent from the SVC 3, and recognizes the CM number of its own (Step A2). The received CM number is stored in the memory 23 as the CM information 231. The details of processing of the CM number recognizing unit 221 will be described later with reference to FIG. 9.

At the CM 2, the connector checking unit 222 performs a coupling check on the communication cables 8 at the respective connectors 21 provided to the local CM 2, and gathers information about connections with the communication cables 8 (Step A3). In addition, the connector checking unit 222 checks and reads the serial numbers of the communication cables 8 connected to the respective connectors 21 (Step A4). The obtained information is stored in a predetermined area in the memory 23, as the CM connector information 232. The details of processing of the connector checking unit 222 will be described later with reference to FIG. 10.

Also, at the SVC 3, the connector checking unit 322 performs a coupling check on the communication cables 8 at the respective connectors 41 of each of the FRTs 4, and gathers information about connections with the communication cables 8 (Step B2). In addition, the connector checking unit 322 checks and reads the serial numbers of the communication cables 8 connected to the respective connectors 41 (Step B3). The obtained information is stored in a predetermined area in the memory 34, as the FRT connector information 341, in a form of a table, for example (Step B4). The details of processing of the connector checking unit 322 will be described later with reference to FIG. 13.

At the CM 2, the connection normality determining unit 223 sends a port status information request to the SVC 3, together with the CM number of the local CM 2. Thereby, the connection normality determining unit 223 requests, to the SVC 3, the coupled statuses of the communication cables 8 and the serial numbers of the communication cables 8, for the connectors 41 in each FRT 4 which are to be connected to the respective connectors 21 provided to the local CM 2 (Step A5).

At the SVC 3, the connector status notifying unit 323 responds to the CM 2 that has sent the port status information request, with the coupled status and the serial number of the port corresponding to the CM 2 of the received CM number (Step B5). Note that, in the FRT connector information 341, if a serial number corresponding to the connector 41 has not been registered, the connector status notifying unit 323 responds to the originator CM 2 with information indicating uncoupled (certain code). The details of processing of the connector status notifying unit 323 will be described later with reference to FIG. 14.

At the CM 2, the connection normality determining unit 223 compares the coupled status and the serial number notified from the SVC 3, with the coupled status information and the serial numbers of the respective connectors of the communication cables 8 coupled to the connectors 21 in the local CM 2 gathered by the connector checking unit 222 (Step A6).

If the coupled statuses and the serial numbers do not match (refer to the "UNMATCH" route from Step A6), alarm processing, such as turning on an LED, is performed and the processing ends.

Otherwise, if the coupled statuses and the serial numbers match (refer to the "MATCH" route from Step A6), no incorrect connection is determined and a connection normal notification is sent to the SVC 3 (Step A7). The details of processing of the connection normality determining unit 223 will be described later with reference to FIG. 11.

At the SVC 3, when the connection normal notification is received from the CM 2, the startup controlling unit 326 issues a startup instruction of the storage apparatus 1 (Step B6), and the storage apparatus 1 is started. The details of processing of the startup controlling unit 326 will be described later with reference to FIG. 15.

Figure 9:
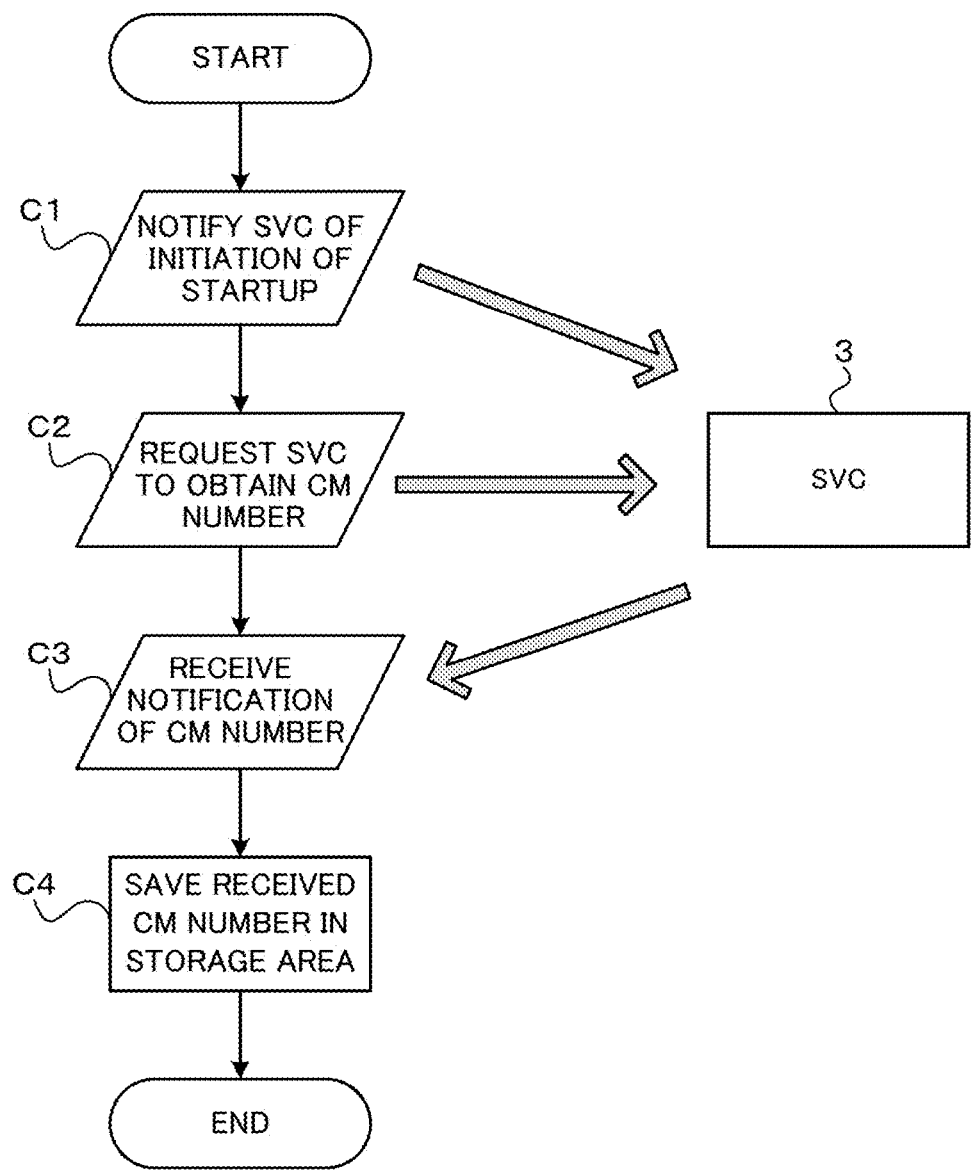
FIG. 9 is a flowchart illustrating processing by a CM number recognizing unit in a CM in the storage apparatus as one example of the first embodiment.

Next, processing by a CM number recognizing unit 221 in a CM 2 in the storage apparatus 1 as one example of the first embodiment will be described with reference to a flowchart (Steps C1-C4) depicted in FIG. 9.

The CM number recognizing unit 221 notifies the SVC 3 of an initiation of an apparatus startup (Step C1), and requests an inquiry of the CM number of the local CM 2 to the SVC 3 (Step C2).

The CM number recognizing unit 221 receives the CM number notification replied from the SVC 3 (Step C3), and saves the received CM number in a predetermined storage area in the memory 23, as the CM information 231 (Step C4), the processing ends.

Figure 10:
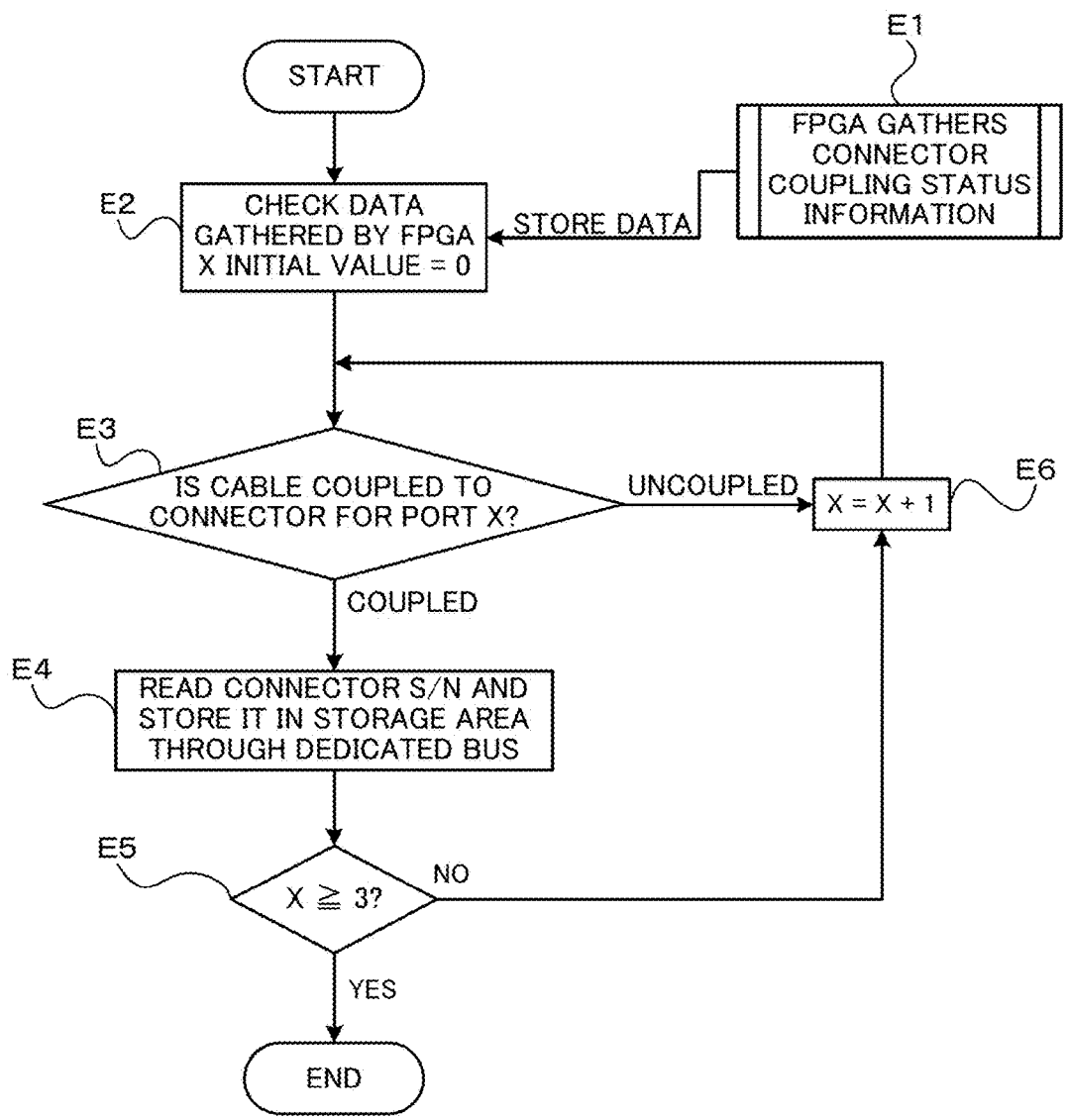
FIG. 10 is a flowchart illustrating processing by a connector checking unit in a CM in the storage apparatus as one example of the first embodiment.

Next, processing by a connector checking unit 222 in a CM 2 in the storage apparatus 1 as one example of the first embodiment will be described with reference to a flowchart (Steps E1-E6) depicted in FIG. 10.

At the CM 2, the FPGA in the monitor device 25 gathers the respective coupled statuses of the communication cables 8 at the connectors 21 (Step E1).

The connector checking unit 222 reads the coupled status information gathered by the FPGA, and stores it in the memory 23 as the CM connector information 232. The connector checking unit 222 checks the coupled statuses that are read (Step E2). In addition, a variable X is initialized by setting a value of 0 (X=0). Note that X is a variable corresponding to the number of connectors 21 provided to the CM 2, and in the present embodiment, for example, X is a natural number of 0≤X≤3.

It is checked whether or not a communication cable 8 is coupled to the connector 21 at PortX (Step E3).

If it is determined that a communication cable 8 is not coupled to the connector 21 at PortX (refer to the "UNCOUPLED" route from Step E3), X is incremented (X=X+1) and (Step E6) and the control returns to Step E3.

If a communication cable 8 is coupled to the connector 21 at PortX in this determination (refer to the "COUPLED" route from Step E3), the connector checking unit 222 reads the serial number of the communication cable 8 connected to the connector 21 through the data bus, and stores it in the memory 23 as the CM connector information 232 (Step E4).

Thereafter, it is checked whether or not X is three or greater (Step E5). If X is less than three (refer to the NO route from Step E5), the control proceeds to Step E6. Otherwise, if X is three or greater (refer to the YES route from Step E5), the processing ends.

Figure 11:
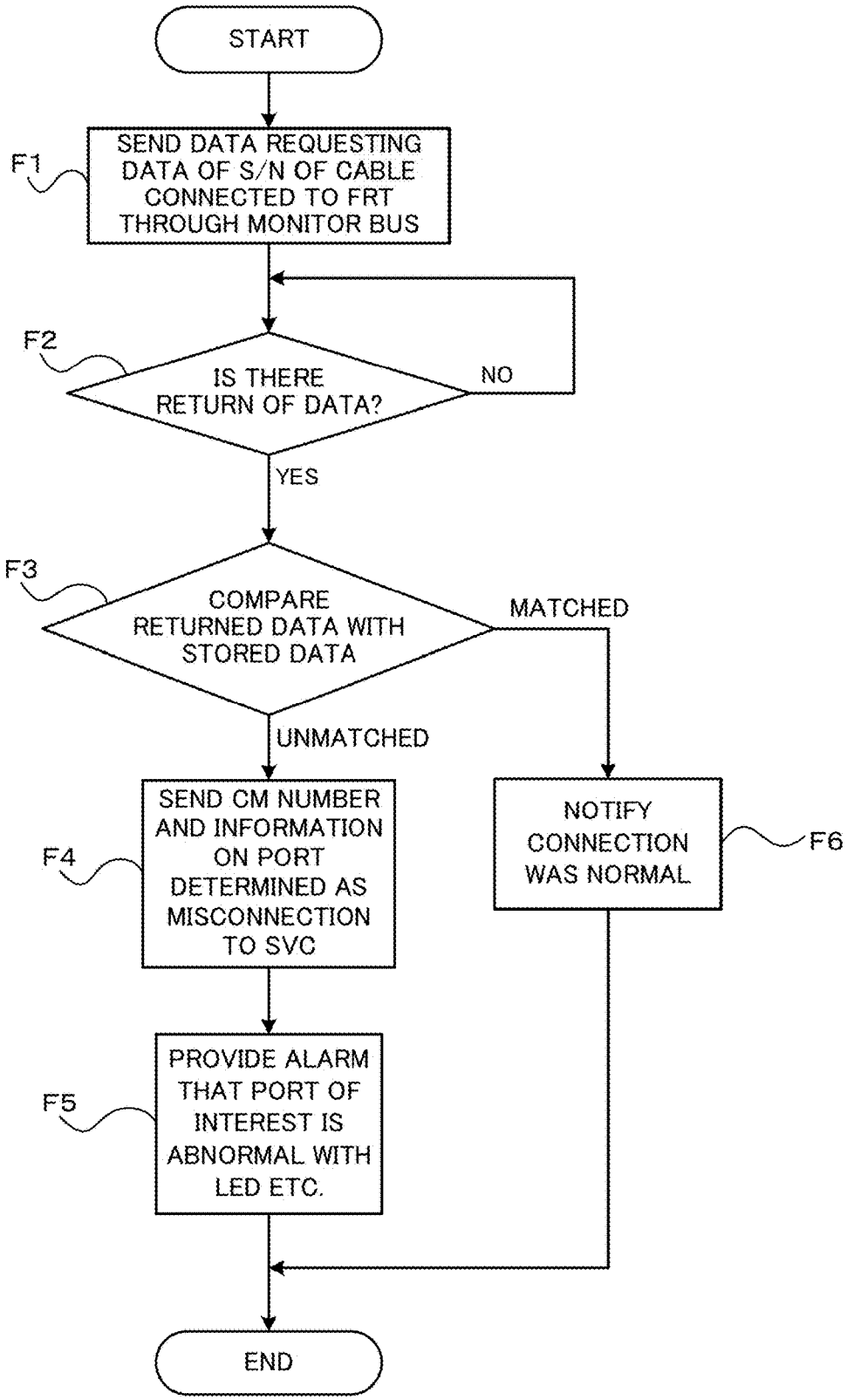
FIG. 11 is a flowchart illustrating processing by a connection normality determining unit in a CM in the storage apparatus as one example of the first embodiment.

Next, processing by a connection normality determining unit 223 in a CM 2 in the storage apparatus 1 as one example of the first embodiment will be described with reference to a flowchart (Steps F1-F6) depicted in FIG. 11.

The connection normality determining unit 223 sends, to the SVC 3, a port status information request that requests data of the serial number of the communication cable 8 connected to the connector 41 in the FRT 4, through the monitor interface cable 70 (Step F1).

The connection normality determining unit 223 checks whether or not there is a response (data reply) to the port status information request from the SVC 3 (Step F2). If there is no reply (refer to the NO route from Step F2), Step F2 is repeated.

If there is a data reply to the port status information request from the SVC 3 (refer to the YES route from Step F2), the connection normality determining unit 223 compares the coupled status information and the serial number replied from the SVC 3, with the CM connector information 232 stored in the memory 23 (Step F3).

If the coupled status information and the serial number replied from the SVC 3 completely match the coupled status information and the serial numbers of the respective connectors of the communication cables 8 coupled to the connectors 21 in the local CM 2 gathered by the connector checking unit 222 (refer to the "MATCH" route from Step F3), the control proceeds to Step F6. Specifically, the connector checking unit 222 notifies the SVC 3 that the connections are normal (connection normal notification), and the processing ends.

Otherwise, if the coupled status information and the serial number replied from the SVC 3 do not match the coupled status information and the serial numbers of the respective connectors of the communication cables 8 coupled to the connectors 21 in the local CM 2 gathered by the connector checking unit 222 (refer to the "UNMATCH" route from Step F3), the control proceeds to Step F4.

Specifically, for the connector 21 (port) for which at least one of the coupled status information and the serial number does not match, the connector checking unit 222 sends, to the SVC 3, information identifying that port and the CM number of that CM 2 (Step F4).

In addition, after the connector checking unit 222 notifies an operator or any other users that there is an incorrect connection on the communication cable 8, by performing alerting processing, such as turning on warning light, e.g., an LED, or outputting a message indicating that an incorrect connection is found on a display (not illustrated) (Step F5), the processing ends.

Figure 12:
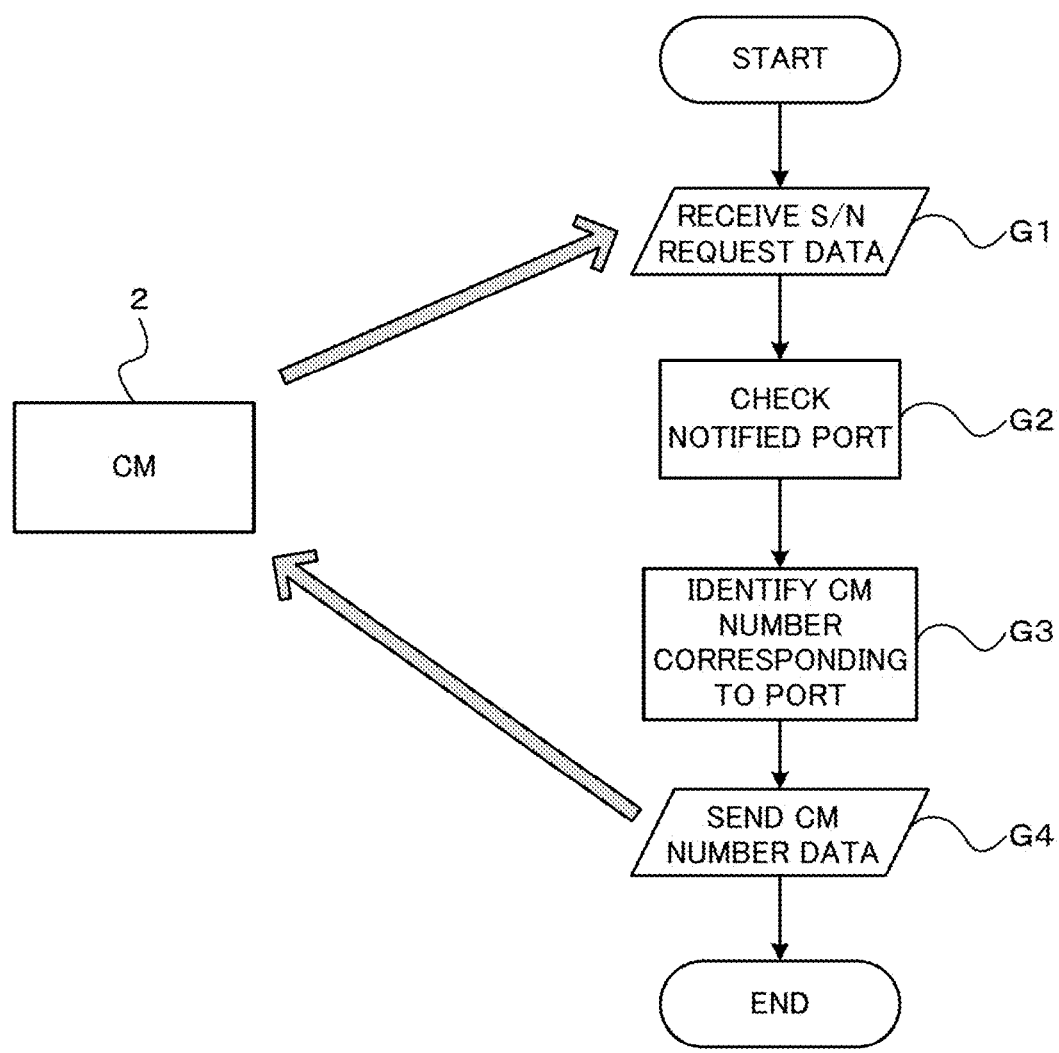
FIG. 12 is a flowchart illustrating processing by a CM number providing unit in an SVC in the storage apparatus as one example of the first embodiment.

Next, processing by the CM number providing unit 321 in the SVC 3 in the storage apparatus 1 as one example of the first embodiment will be described with reference to a flowchart (Steps G1-G4) depicted in FIG. 12.

When an interrupt notification is received from a CM 2 through a monitor interface cable 70, the CM number providing unit 321 starts the processing (Step G1).

The CM number providing unit 321 examines factors of the entered interrupt notification, and determines to which connector 31, i.e., to which port the interrupt signal is entered (Step G2).

The CM number providing unit 321 identifies (determines) the CM 2 that has sent the CM number inquiry entered as the interrupt signal, by looking up the CM number matching information, based on the port number of the port to which the interrupt signal is entered (Step G3).

The CM number providing unit 321 then sends the identified CM number to the CM 2 that has sent the CM number inquiry, via the connector 31, the monitor interface cable 70, and the connector 24 (Step G4), and the processing ends.

Figure 13:
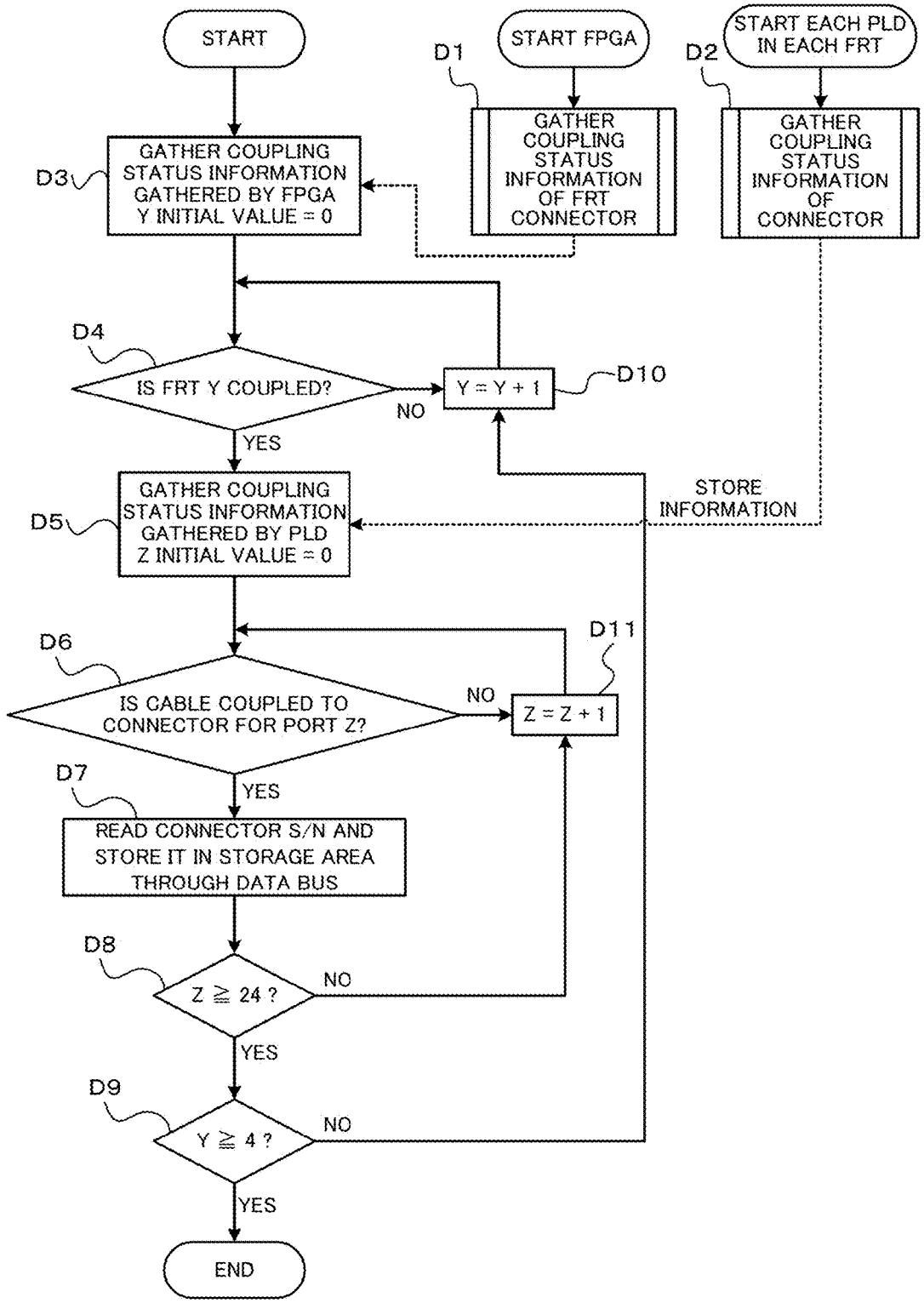
FIG. 13 is a flowchart illustrating processing by a connector checking unit in the SVC in the storage apparatus as one example of the first embodiment.

Next, processing by the connector checking unit 322 in the SVC 3 in the storage apparatus 1 as one example of the first embodiment will be described with reference to a flowchart (Steps D1-D11) depicted in FIG. 13.

When the FPGA 33 in the monitor device 30 in the SVC 3 is started, the connector checking unit 322 gathers coupled status information of an FRT connector (not illustrated) provided to the midplane 5 (Step D1). Specifically, the connector checking unit 322 checks whether or not each FRT 4 is coupled in the midplane 5.

In addition, when a PLD in each FRT 4 is started, each PLD gathers the coupled status of the connector 41 of its own (Step D2).

The connector checking unit 322 reads the coupled status information of the FRT 4 gathered by the FPGA 33 in Step D1, stores it in the memory 34 as the FRT connector information 341 (Step D3). In addition, variable Y is initialized by setting a value of 0 (Y=0).

Note that Y is a variable corresponding to the number of FRTs 4, in the present embodiment, for example, Y is a natural number of $0 \le Y \le 23$, and used as FRT #Y for expressing an arbitrary FRT 4. This flowchart illustrates an example where Y=4.

The connector checking unit 322 checks whether or not FRT #Y is coupled to the midplane 5, i.e., mounted (Step D4).

If it is determined that FRT #Y is not coupled (refer to the NO route from Step D4), Y is incremented (Y=Y+1) (Step D10) and the control returns to Step D4.

If FRT #Y is coupled (refer to the YES route from Step D4), the connector checking unit 322 reads the coupled status information of each connector 41 at FRT #Y gathered by the PLD in Step D2 (Step D5). The connector checking unit 322 stores the coupled status information of each connector 41 that is read, in the memory 34 as the FRT connector information 341. In addition, variable Z is initialized by setting a value of 0 (Z=0).

Note that Z is a variable corresponding to the number of connectors 41 provided to the FRT 4, and in the present embodiment, Z is a natural number of $0 \le Z \le 23$, for example. This flowchart illustrates an example where Z=24.

The connector checking unit 322 checks whether or not a communication cable 8 is coupled to the connector 41 at PortZ (Step D6).

If it is determined that a communication cable 8 is not coupled to the connector 41 at PortZ (refer to the NO route from Step D6), Z is incremented (Z=Z+1) (Step D11) and the control returns to Step D6.

If a communication cable 8 is coupled to the connector 41 at PortZ (refer to the YES route from Step D6), the connector checking unit 322 reads the serial number of the communication cable 8 that is connected to the connector 41 via the first data bus 90, and stores it in the memory 34 as the FRT connector information 341 (Step D7).

Thereafter, it is checked whether or not Z is 24 or greater (Step D8). When Z is less than 24 (refer to the NO route from Step D8), the control proceeds to Step D11. Otherwise, when Z is 24 or greater (refer to the YES route from Step D8), the control proceeds to Step D9.

Specifically, it is checked whether or not Y is 4 or greater (Step D9). When Y is less than 4 (see the NO route from Step D9), the control proceeds to Step D10. Otherwise, when Y is 4 or greater (refer to the YES route from Step D9), the processing ends.

Figure 14:
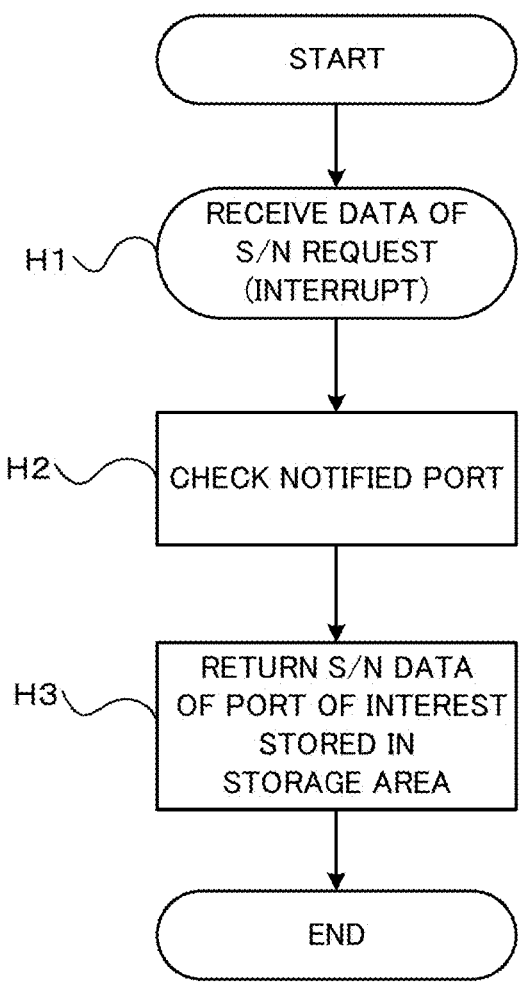
FIG. 14 is a flowchart illustrating processing by a connector status notifying unit in the SVC in the storage apparatus as one example of the first embodiment.

Next, processing by the connector status notifying unit 323 in the SVC 3 in the storage apparatus 1 as one example of the first embodiment will be described with reference to a flowchart (Steps H1-H3) depicted in FIG. 14.

This processing starts when an interrupt notification of a port status information request is received in the SVC 3 from a connection normality determining unit 223 in a CM 2 (Step H1).

The connector status notifying unit 323 examines factors of the entered interrupt notification determines to which connector 31, i.e., to which port the interrupt signal is entered (Step H2).

The connector status notifying unit 323 identifies the CM 2 that has sent the port status information request entered as the interrupt signal, by looking up the CM number matching information, based on the port number of the port to which the interrupt signal is entered.

The connector status notifying unit 323 then reads FRT connector information (the coupled status and the serial number of the communication cable 8) of the port corresponding to the CM 2 that has sent the port status information request, by looking up the FRT connector status information 341, and sends it to the CM 2 that has sent the port status information request (Step H3). The processing ends.

Figure 15:
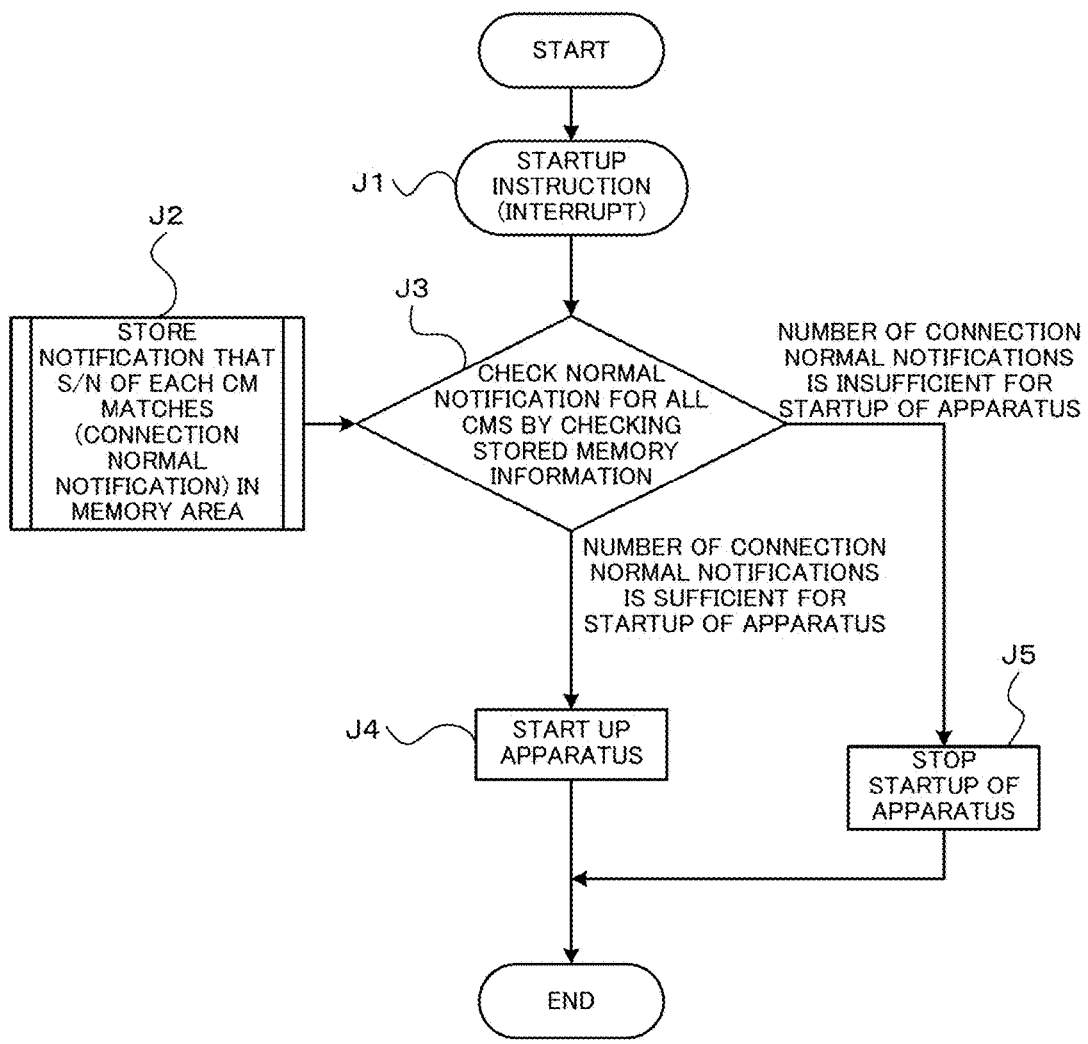
FIG. 15 is a flowchart illustrating processing by a startup controlling unit in the SVC in the storage apparatus as one example of the first embodiment.

Next, processing by the startup controlling unit 326 in the SVC 3 in the storage apparatus 1 as one example of the first embodiment will be described with reference to a flowchart (Steps J1-J5) depicted in FIG. 15.

This processing is started when an interrupt notification of a connection normal notification is received in the SVC 3 from a connection normality determining unit 223 in a CM 2 (Step J1).

In the SVC 3, when the connection normal notification is received from the CM 2, information indicating that the connection normal notification was received is stored in a predetermined storage area in the memory 34 (Step J2).

The startup controlling unit 326 checks, for each of the CMs 2, whether or not a connection normal notification is sent, by looking up the information stored in the memory 34. The startup controlling unit 326 checks whether connection normal notifications are received from the sufficient number of CMs 2 to start the storage apparatus 1 (Step J3). Note that from the sufficient number of CMs 2 to start the storage apparatus 1 is set in advance, and this value is used as the threshold.

If connection normal notifications are received from the sufficient number of CMs 2 to start the storage apparatus (refer to "NUMBER OF CONNECTION NORMAL NOTIFICATIONS IS SUFFICIENT FOR STARTUP OF APPARATUS" route from Step J3), the startup controlling unit 326 initiates a control to start the storage apparatus 1 (Step J4).

Otherwise, if connection normal notifications are not received from the sufficient number of CMs 2 to start the storage apparatus 1 (refer to "NUMBER OF CONNECTION NORMAL NOTIFICATIONS IS INSUFFICIENT FOR STARTUP OF APPARATUS" route from Step J3), the startup controlling unit 326 prevents the storage apparatus 1 from being started (Step J5). Thereafter, this processing ends.

(c) Advantages

As described above, in the storage apparatus 1 as one example of the first embodiment, the connection normality determining unit 223 determines whether or not connections with the communication cable 8 between the connectors 21 provided to the CM 2 and the connectors 41 provided to the FRT 4 are correct. Thereby, it is easily determined whether or not the CMs 2 and the FRTs 4 are properly connected using the communication cables 8.

The connection normality determining unit 223 compares the coupled statuses of the respective communication cables 8 to the connectors 21 in the CMs 2, checked by the connector checking unit 222 in the CM 2, with the coupled statuses of the respective communication cables 8 to the connectors 41 in the FRTs 4, checked by the connector checking unit 322 in the SVC 3. Thereby, the coupled status of one connector of a communication cable 8 to a connector 21 in a CM 2, and the coupled status of the other connector to a connector 41 in an FRT 4, are easily checked, and whether or not the communication cables 8 are properly connected can be easily determined.

A CM number inquiry and a CM number notification are exchanged between the CM number recognizing unit 221 in a CM 2 and the CM number providing unit 321 in the SVC 3, through a monitor interface cable 70. Thereby, even if a communication cable 8 is not properly connected between a CM 2 and an FRT 4, the CM number inquiry and CM number notification can be exchanged in a reliable manner.

(B) Second Embodiment

For example, in the storage apparatus 1, in a situation where the sizes of apparatuses are increased even with cabling of communication cables 8, the number of communication cables 8 tends to be increased. Such cabling tasks are done manually. Therefore, it is regarded that it is difficult to avoid incorrect connections of communication cables 8 in a storage apparatus 1.

Thus, a storage apparatus 1 of a second embodiment includes functions to autonomously correct any incorrect connections with communication cables 8 between CMs 2 and FRTs 4, thereby achieving reliable communications between the CMs 2 and the FRTs 4.

(a) Configuration

Figure 16:
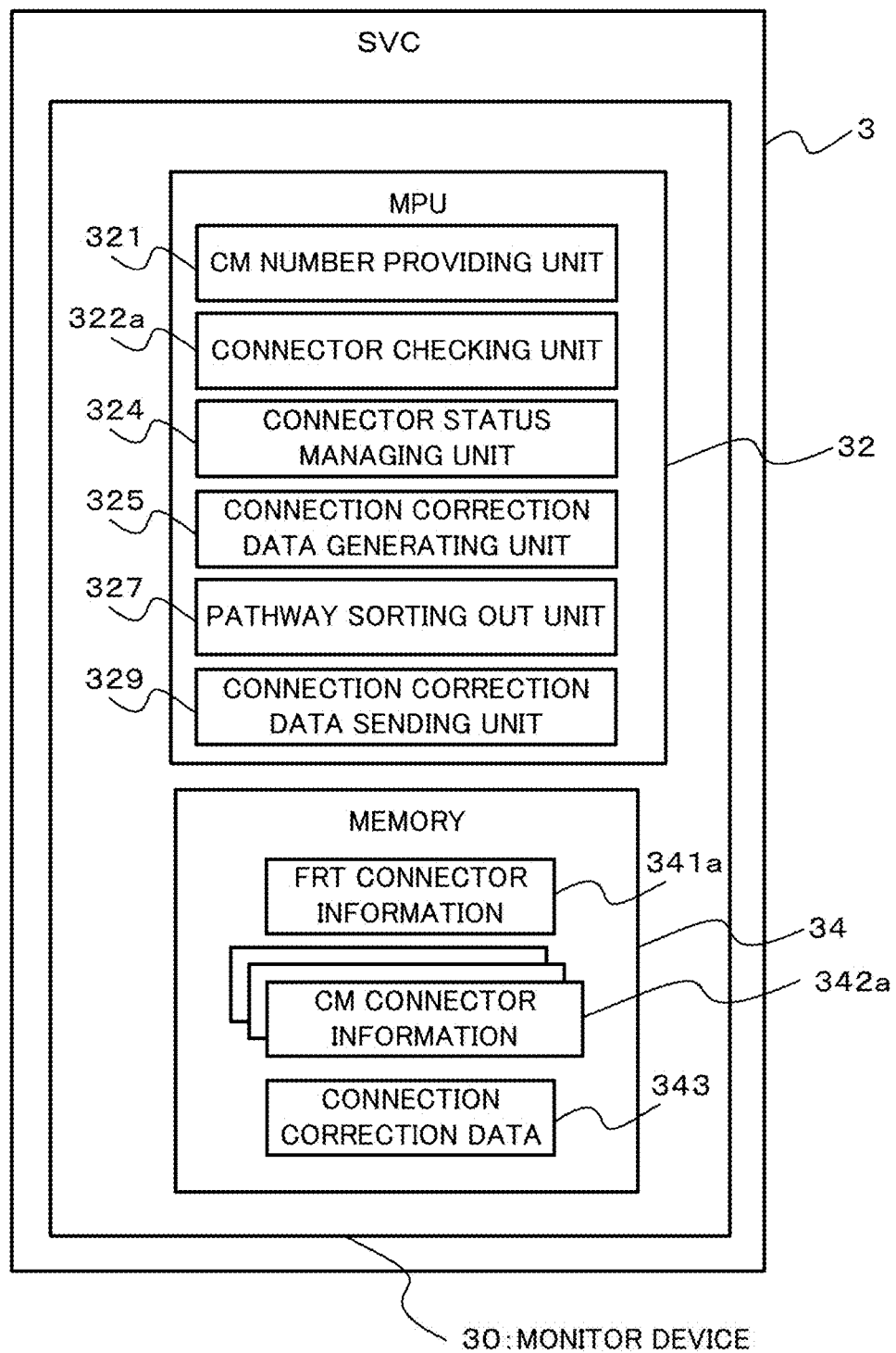
FIG. 16 is a diagram depicting the functional configuration of an SVC in a storage apparatus as one example of a second embodiment.
Figure 17:
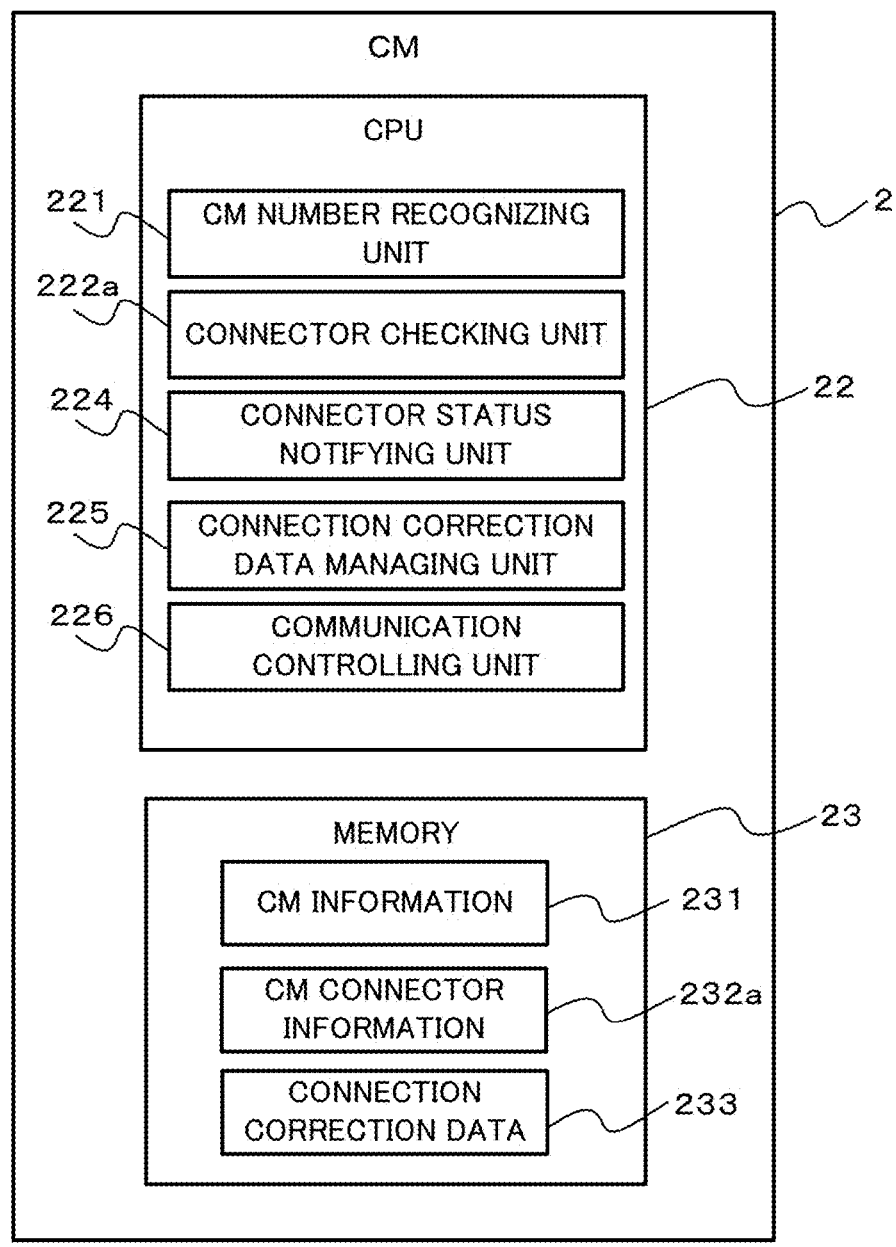
FIG. 17 is a diagram depicting the functional configuration of a CM in the storage apparatus as one example of the second embodiment.

FIG. 16 is a diagram depicting the functional configuration of an SVC 3 in a storage apparatus 1 as one example of a second embodiment, and FIG. 17 is a diagram depicting the functional configuration of that CM 2.

Since reference symbols that are identical to the aforementioned reference symbols denote similar elements in the drawings, detailed descriptions thereof will be omitted.

As depicted in FIG. 16, in the storage apparatus 1 as one example of the second embodiment, in an SVC 3, an MPU 32 includes functions as a CM number providing unit 321, a connector checking unit 322*a*, a connector status managing unit 324, a connection correction data generating unit 325, a pathway sorting out unit 327, and a connection correction data sending unit 329.

The connector checking unit 322*a* gathers information on connections with the communication cables 8 at each of the connectors 41, for each of the FRTs 4. Specifically, the connector checking unit 322*a* gathers respective serial numbers of connectors 41 in each FRT 4, from the each FRT 4 via a first data bus 90. Since the connector checking unit 322*a* gathers serial numbers in the similar manner as the connector checking unit 322 in the first embodiment, detailed descriptions thereof will be omitted.

The serial number gathered by the connector checking unit 322*a* is stored in a predetermined area in the memory 34 as FRT connector information 341*a*, while being related to information for identifying the connector 41.

FIG. 18 is a diagram illustrating the FRT connector information 341*a* in the storage apparatus 1 as one example of the second embodiment. In the example depicted in FIG. 18, the FRT connector information 341*a* is illustrated in a table format, for the sake of brevity.

The FRT connector information 341*a* depicted in FIG. 18 includes an FRT No., a connector No, and a serial number (S/N), which are related to each other, as entries.

The FRT No. is an identifier for identifying an FRT 4, and "0", "1", "2", and "3" represent FRT #0, FRT #1, FRT #2, FRT #3, respectively, for example.

The connector No. is an identifier for identifying a connector 41 (port) in the FRT 4, and "0", "1", "2", and "3" correspond to the connectors 41 connected to Port0, Port1, Port2, and Port3 provided to the FRT 4, respectively, for example.

The serial number is information gathered by the connector checking unit 322. Note that in this second embodiment, serial numbers are represented by four-digit integers.

Accordingly, the first entry in the table depicted in the example in FIG. 18, for example, indicates that the communication cable 8 with a serial number of "1234" is coupled to the connector 41 of Port0 of FRT #0.

As described above, the connector checking unit 322*a* functions as a first gathering unit that gathers, for connectors 41 of each of the FRTs 4, the serial number (first identifier) of the communication cable 8 that is coupled (connected) to the connector 41.

The connector status managing unit (first managing unit) 324 receives the respective serial numbers (first identifiers) of communication cables 8 that are coupled to connectors 21 in each CM 2, which are sent from the connector status notifying unit 224 (described later) in the each CM 2. The connector status managing unit 324 then stores and manages the received serial numbers in a predetermined storage area in a memory (first storage apparatus) 34, while relating them to identifiers for identifying the connectors 21 in the CM 2, as CM connector information (first identifier) 342*a*.

The CM connector information 342*a* is information about the communication cables 8 at the respective connectors 21 provided to the CM 2, and is generated by gathering the CM connector information 232*a* (refer to FIG. 17) sent by the connector status notifying unit 224 in the each CM 2.

The CM connector information 232*a* includes serial numbers that are read from the respective communication cables 8 coupled to the connectors 21 provided to each CM 2.

Figure 19:
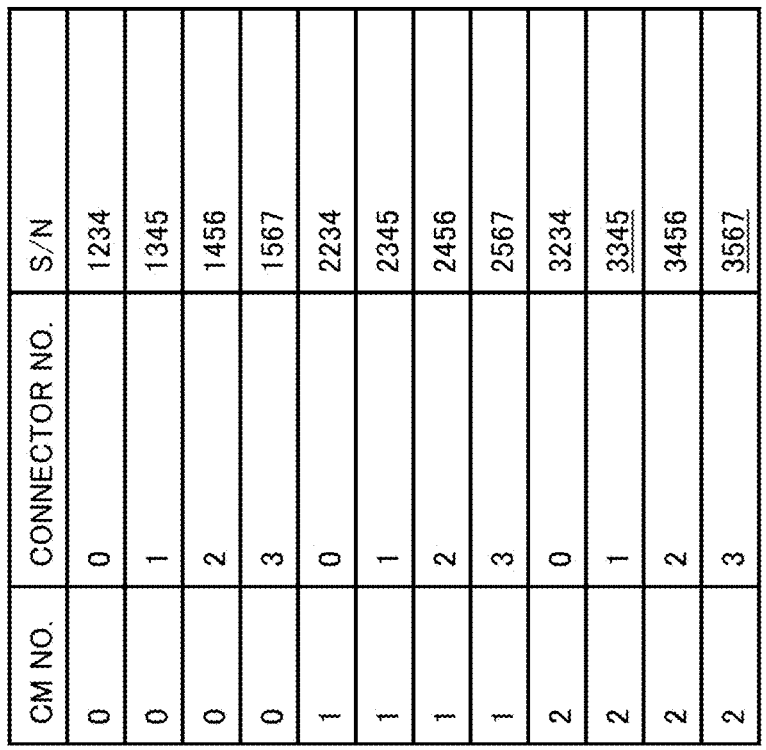
FIG. 19 is a diagram illustrating an example of CM connector information in the storage apparatus as one example of the second embodiment.

FIG. 19 is a diagram illustrating the CM connector information 342*a* in the storage apparatus 1 as one example of the second embodiment. In the example depicted in FIG. 19, the CM connector information 342*a* is illustrated in a table format, for the sake of brevity.

The CM connector information 342a depicted in FIG. 19 includes a CM number, a connector No., and a serial number (S/N), as entries CM number, which are related to each other.

The CM number is the CM number of each CM 2, and values of "0", "1", "2", and "3" indicate CMs #0, #1, #2, and #3, respectively, for example. While CMs #3 and #4 are not illustrated in the example depicted in FIG. 1, these CM #2 and #3 also have configurations as those of CMs #0 and #1.

The connector No. is an identifier for identifying each connector 21 (port) in the CM 2, and values of "0", "1", "2", and "3" indicate the respective connectors 21 connected to Port0, Port1, Port2, and Port3 provided to the CM 2, for example.

The serial number is information gathered by the connector checking unit 222a described later.

For example, the first entry in the table depicted in FIG. 19 indicates that the communication cable 8 with a serial number of "1234" is connected (couple) to the connector 21 of Port0 of CM #0.

As described above, the connector checking unit 222a (refer to FIG. 17) functions as a second gathering unit that gathers, for each connector 21 in the CM 2, the serial number (first identifier) of the communication cable 8 that is coupled (connected) to the connector 21.

The connection correction data generating unit 325 checks connections between the CM 2 and the FRT 4 through the communication cables 8, and determines whether or not the communication cables 8 connected to the connector 21 in the CM 2 are properly connected to the connectors 41 in the FRT 4, in accordance with the apparatus specifications.

For example, the connection correction data generating unit 325 looks up the respective serial numbers of the connectors 41 in each FRT 4 gathered by the connector checking unit 322a, and the respective serial numbers of connectors 21 in each CM 2, which are managed by the connector status managing unit 324 and sent from the connector status notifying unit 224 in the each CM 2. The connection correction data generating unit 325 then checks the relationships between the connectors 21 in the CM 2 and the connectors 41 in the FRT 4, based on those serial numbers.

The connection correction data generating unit 325 then determines whether or not the specification is satisfied, by comparing the respective combinations of the connectors 21 in the CM 2 and the connectors 41 in the FRT 4, with the apparatus specifications that have been set in advance.

If any combination of a connector 21 in the CM 2 and a connectors 41 in the FRT 4 that is not compliant with the apparatus specifications is found, the connection correction data generating unit 325 determines such a combination as an incorrect connection.

Figure 20:
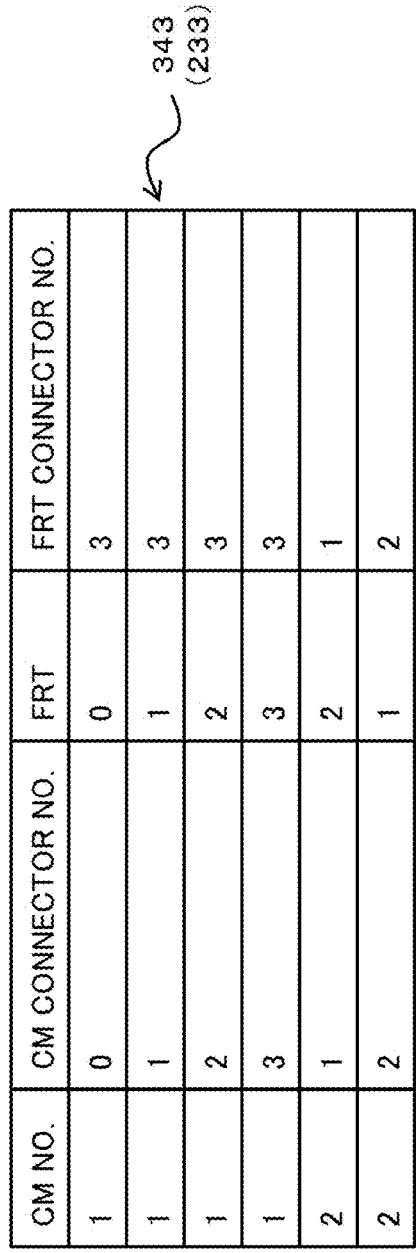
FIG. 20 is a diagram illustrating connection correction data in the storage apparatus as one example of the second embodiment.

FIG. 20 is a diagram illustrating the connection correction data 343 in the storage apparatus 1 as one example of the second embodiment. In the example depicted in FIG. 20, the connection correction data 343 is illustrated in a table format.

The connection correction data 343 exemplified in FIG. 20 is connection correction data 343 that corresponds to the FRT connector status information 341 exemplified in FIG. 18, and to the CM connector information 342 exemplified in FIG. 19.

For example, the apparatus specifications specifies that connectors 21 in the CM 2 of a CM number "0" (CM #0) are to be connected to the connector 41 of a connector No. "0" (Port0) in each FRT 4. Similarly, connectors 21 in a CM 2 with the CM number of "1" (CM #1) are to be connected to the connector 41 of a connector No. "1" (Port1) in each FRT 4, and connectors 21 in the CM 2 of a CM number "2" (CM #2) are to be connected to the connector 41 of a connector No. "2" (Port2) in each FRT 4.

For example, in the example depicted in FIG. 19, the communication cable 8 with a serial number of "1234" is coupled to the connector No. "0" in the CM 2 of a CM number "0" (CM #0). Also, in the example depicted in FIG. 18, the communication cable 8 with a serial number of "1234" is coupled to the connector 41 of a connector No. "0" in the FRT 4 having an FRT No. "0" (FRT #0). Accordingly, the communication cable 8 with a serial number of "1234" is connected to the CM 2 and the FRT 4, in compliant with the apparatus specifications.

As described above, in the CM connector information 342 exemplified in FIG. 19, the connectors 21 in the CM 2 of a CM number "0" (CM #0) are coupled to the connectors 41 of a connector No. "0" in the respective FRTs 4 in compliant with the apparatus specifications, as depicted in FIG. 18.

On the contrary, for example, in the example depicted in FIG. 19, the communication cable 8 with a serial number of "2234" is coupled to the connector No. "0" in the CM 2 of a CM number "1" (CM #1). Also, in the example depicted in FIG. 18, the communication cable 8 with a serial number of "2234" is coupled to the connector 41 of a connector No. "3" in the FRT 4 having an FRT No. "0" (FRT #0).

Thus, although the communication cable 8 with a serial number of "2234" has to be coupled to the connector 41 of a connector No. "1" in the FRT 4 having an FRT No. "0" (FRT #0), it is connected to the CM 2 and the FRT 4 the manner not compliant with the apparatus specifications.

As described above, if there is any combination of a connector 21 in a CM 2 and a connector 41 in an FRT 4 not compliant with the apparatus specifications, the connection correction data generating unit 325 determines such a combination, as the communication cable 8 being connected incorrectly.

In the above-described example, the connection correction data generating unit 325 determines the combination between the connector No. "0" in the CM 2 of a CM number "1" and the connector 41 of a connector No. "3" in the FRT 4 having an FRT No. "0", which is connected through the communication cable 8 with a serial number of "2234", as an incorrect connection.

When any communication cable 8 is determined as having an incorrect connection, the connection correction data generating unit 325 identifies a combination of the connector 21 in the CM 2 and the connector 41 in the FRT 4 for that determined incorrect connection, and, registers it to connection correction data 343.

In the example depicted in FIG. 20, the combination of the connector No. "0" in the CM 2 of a CM number "1" (CM #1) and the connector 41 of a connector No. "3" in the FRT 4 having an FRT No. "0" (FRT #0) connected through the communication cable 8 with a serial number of "2234" that is determined as having an incorrect connection as described above, is registered to the connection correction data 343.

The connection correction data sending unit 329 sends, to each CM 2, the connection correction data 343 generated by the connection correction data generating unit 325.

The pathway sorting out unit 327 performs a control to check connections between the CMs 2 and the FRTs 4 through the communication cables 8, and if multiple communication cables 8 are connected from a single CM 2 to the same FRT 4, eliminates redundant connections, by disconnecting communication cables 8 except for a single communication cable 8.

The apparatus specifications specifies that, in the storage apparatus 1, upon connecting from the CMs 2 to the FRTs 4 through the communication cables 8, the number of connection lines equivalent to the number of FRTs 4 are to be defined, in each CM 2, by connecting each CM 2 to all FRTs 4 with a single communication cable 8. Thus, connections are made from one CM 2 to the same FRT 4 with multiple communication cables 8 (redundant connections), no connection is made from that CM 2 to any of the FRTs 4. Accordingly, the pathway sorting out unit 327 has a function to detect any redundant connections from the CM 2 to the same FRT 4 and sort out to a single valid connection.

The pathway sorting out unit 327, if there are any duplicated cable connections (pathways) among the CMs 2 and the FRT 4, disables those duplicated pathways, except for one pathway.

Specifically, the pathway sorting out unit 327, if there are any duplicated pathways among the CMs 2 and the FRT 4, selects a single port (the connector 21) to be used, and disables other pathways by disconnecting ports in the FRT 4.

The pathway sorting out unit 327, upon disabling pathways, for example, if there is any pathway that is compliant with the apparatus specifications among the duplicated pathways, disables all of such pathways, except for the pathway that is compliant with the apparatus specifications. Otherwise, if there is no pathway that is compliant with the apparatus specifications among the duplicated pathways, various modifications may be made, such as preferentially select a pathway to be remained, which has the smallest CM number, FRT No., connector No., or the like, for example.

Hereinafter, examples of how a pathway to be used is selected among duplicated pathways, if there are any duplicated pathways among the CMs 2 and the FRT 4.

(Example 1) CM #0 is Redundantly Connected to FRT #0 Through Three Lines For example, if the standard apparatus specifications specify that Connector #0 has to use CM #0, the pathway sorting out unit 327 selects to use only the pathway that uses Connector #0 compliant with the apparatus specifications, and disconnects Connectors #1 and #2 in other lines.

Specifically, if there is any pathway compliant with the apparatus specifications among the redundant pathways, a pathway specified in the apparatus specifications is used.

(Example 2) CM #1 is Connected to FRT #1 Only with a Single Line

For example, even if the standard apparatus specifications specify that that Connector #1 has to use CM #1, when the connection line count is one as specified (non-redundant connection), the connection of Connector #0 is permitted although this is not compliant with the apparatus specifications. The connection correction data generating unit 325 then generates connection correction data 343, the communication controlling unit 226 makes a connection using the connection correction data 343.

Specifically, although a CM 2 and an FRT 4 are connected with a pathway that is not compliant with the apparatus specifications, given that the CM 2 and the FRT 4 are connected with a pathway of a single line, that pathway is permitted even if that pathways is not compliant with the apparatus specifications.

(Example 3) CM #1 is Connected to FRT #2 with Two Lines

For example, when the standard apparatus specifications specify that CM #1 has to use Connector #1, the connection of Connector #1 that is compliant with the apparatus specifications is permitted and the connection correction data generating unit 325 generates connection correction data 343. The communication controlling unit 226 makes a connection using the connection correction data 343. Connector #0 is disconnected since it is an extra connection.

In addition, if two or more lines are connected and there is no connection with a connector specified in the apparatus specifications, a one that is connected to a connector having a smaller connector No. is preferentially selected, for example.

For example, in the example depicted in FIG. 19, the communication cable 8 with a serial number of "3345" is connected to the connector 21 of the connector No. "1" in CM #2 with CM number "2", and the communication cable 8 with a serial number of "3367" is connected to the connector 21 of connector No. "3" in CM #2 with CM number "2".

Also, in the example depicted in FIG. 18, the communication cable 8 with a serial number of "3345" is connected to the connector 41 of a connector No. "1" in FRT #1 with FRT No. "1", and the communication cable 8 with a serial number of "3367" is connected to the connector 41 of a connector No. "2" in FRT 4 #1 with FRT No. "1".

Specifically, CM #2 and FRT #1 are connected through two communication cable 8, which is a duplicated pathway configuration.

The pathway sorting out unit 327 disables, among these redundant connections, the connection with the connector 41 of a connector No. "1" by disconnecting it to keep the connection between CM #2 and the connector 41 of a connector No. "2" in FRT #1, which is compliant with the apparatus specifications, for example.

In addition, for the excessively connected and disconnected port in the FRT 4, an alarm is issued in the storage apparatus 1 in response to the disconnection and the fault is detected. Accordingly, a user is notified that there was an incorrect connection at the port in the FRT 4.

In response to the disconnection of the port in the FRT 4, a control program handles it as a line fault in the CM 2. Thereby, the system administrator and other users can be notified of an incorrect wiring between the CM 2 and the FRT 4.

Thereafter, after the wiring with the communication cable 8 is properly corrected by a maintenance engineer or other users, a recovery of line is notified.

In addition, as depicted in FIG. 17, the CPU 22 in each CM 2 includes functions as a CM number recognizing unit 221, a connector checking unit 222*a*, a connector status notifying unit 224, a connection correction data managing unit 225, and a communication controlling unit 226.

The connector checking unit 222*a* gathers information about connections with the communication cables 8 at each connector 21 provided to the local CM 2. Specifically, the connector checking unit 222*a*, for each connector 21, gathers the serial number of the communication cable 8 that is coupled to the connector 21. Since the connector checking unit 222*a* gathers serial numbers in the similar manner as the connector checking unit 222 in the first embodiment, detailed descriptions thereof will be omitted.

The serial numbers gathered by the connector checking unit 222a are stored in a predetermined area in the memory 23, while being related to information for identifying the connector 21, as CM connector information 232a (refer to FIG. 17).

As described above, the connector checking unit 222a functions as a second gathering unit that gathers, for each connector 21 provided to the CM 2, the serial number (second identifier) of the communication cable 8 connected to the connector 21.

Similarly to the connector checking unit 222 in the first embodiment, the connector checking unit 222a may gather a coupled status (second connected status information) that indicates a connected status of a communication cable 8.

The connector status notifying unit 224 notifies the SVC 3 of information gathered by the connector checking unit 222a. The connector status notifying unit 224 stores the serial number of the communication cable 8 coupled to the connector 21, which is gathered by the connector checking unit 222a, in notification data, while relating to information for identifying the connector 21 (e.g., connector No.).

The notification data is stored in a predetermined storage area in the memory 23, for example, and the serial number of the communication cable 8, that is related to the connector No. of the connector 21 to which the communication cable 8 is connected is stored.

The connector status notifying unit 224 then sends, to the SVC 3, the notification data through the monitor interface cable 70.

The connection correction data managing unit 225 receives the connection correction data 343 sent from the connection correction data generating unit 325 in the SVC 3, and stores it in a predetermined storage area in the memory 23 as connection correction data 233. If connection correction data 233 has already been stored in the memory 23, when the connection correction data managing unit 225 receives additional connection correction data 343 from the SVC 3, it updates the connection correction data 233 that has been stored in the memory 23, with the new connection correction data 343 that is received.

The communication controlling unit 226 performs a control to send data from that CM 2 to the other CMs 2.

The communication controlling unit 226, upon sending data to the connector 21 in the CM 2 registered in the connection correction data 233, in the connection correction data 233, selects the connector 41 in the FRT 4 that has been registered in combination with the counterpart connector 21, as a communication pathway, and sends the data.

Accordingly, the communication controlling unit 226 performs a pathway switching control that uses, when data is sent to the connector 21 in the CM 2 registered in the connection correction data 233, the connector 41 in the FRT 4 registered in the connection correction data 233, in place of the connector 41 in the FRT 4 specified in the apparatus specifications.

Thereby, even if a communication cable 8 is not properly connected between a CM 2 and an FRT 4, data can be properly sent from an originator CM 2 to a destination CM 2.

In addition, upon sending data to a connector 21 in the CM 2 that has not been registered in the connection correction data 233, the communication controlling unit 226 sends data using predetermined communication pathway (the connector 41 in the FRT 4) in accordance with the apparatus specifications.

For example, in the example depicted in FIGS. 19-20, since the connectors 21 in CM #0 are connected to the connectors 41 with a connector No. "0" in FRTs #0 to #3 compliant with the apparatus specifications, the connectors 21 in CM #0 are not registered in the connection correction data 343 (refer to FIG. 20). Accordingly, the communication controlling unit 226, upon sending data from CM #0, uses the connector 41 in the FRT 4 specified in the apparatus specifications.

In contrast, the respective communication cables 8 connected to the connectors 21 in CM #1 are incorrectly connected to the connectors 41 with a connector No. "3" in FRTs #0 to #3, which is not compliant with the apparatus specifications. Specifically, all ports in the CM 2 are connected to the connectors 41 in the manner not compliant with the apparatus specifications. In such a case, the communication controlling unit 226, in every occasion to send data from CM #1, looks up the connection correction data 343, switches (corrects) the connector 41 in the FRT 4 to be used as a communication pathway.

(b) Operations

Figure 21:
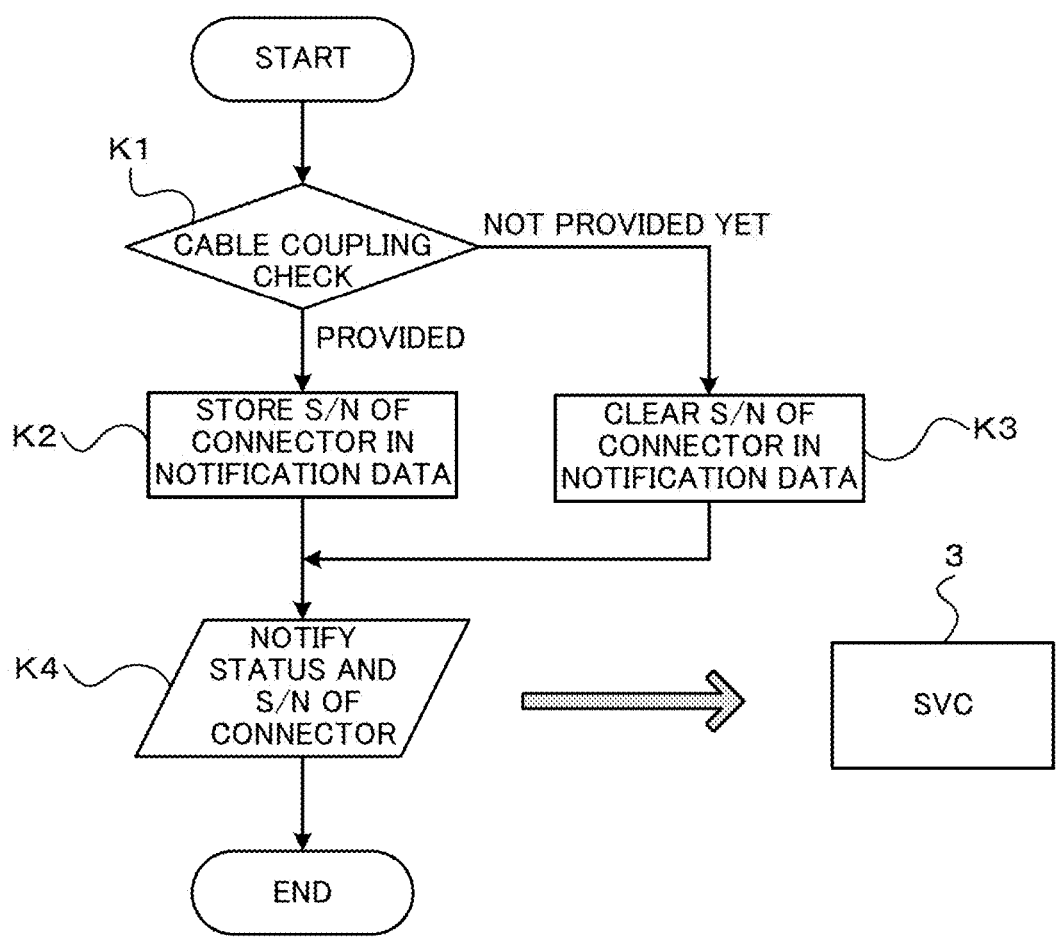
FIG. 21 is a flowchart illustrating processing by a connector checking unit and a connector status notifying unit in a CM in the storage apparatus as one example of the second embodiment.

Processing by a connector checking unit 222a and a connector status notifying unit 224 in a CM 2 in the storage apparatus 1 as one example of the second embodiment configured as described above, will be described with reference to a flowchart (Steps K1-K4) depicted in FIG. 21.

The connector checking unit 222a checks a coupled status of a communication cables 8 at a connectors 21, via the FPGA in the monitor device 25 (Step K1).

If it is determined that a communication cable 8 is coupled to the connector 21 (refer to the "COUPLED" route from Step K1), the connector status notifying unit 224 stores the serial number obtained by the connector checking unit 222, in notification data that is stored in a predetermined storage area in the memory 23 (Step K2) and the control proceeds to Step K4.

Otherwise, if it is determined that a communication cable 8 is not coupled to the connector 21 (refer to the "NOT COUPLED YET" route from Step K1), the connector status notifying unit 224 clears the serial number of the connector 21 in the notification data (Step K3) and the control proceeds to Step K4.

After the serial numbers of all of the connectors 21 in the CM 2 to which communication cables 8 are coupled are stored in notification data, the connector status notifying unit 224 sends the notification data to the SVC 3 (Step K4) and the processing ends.

Figure 22:
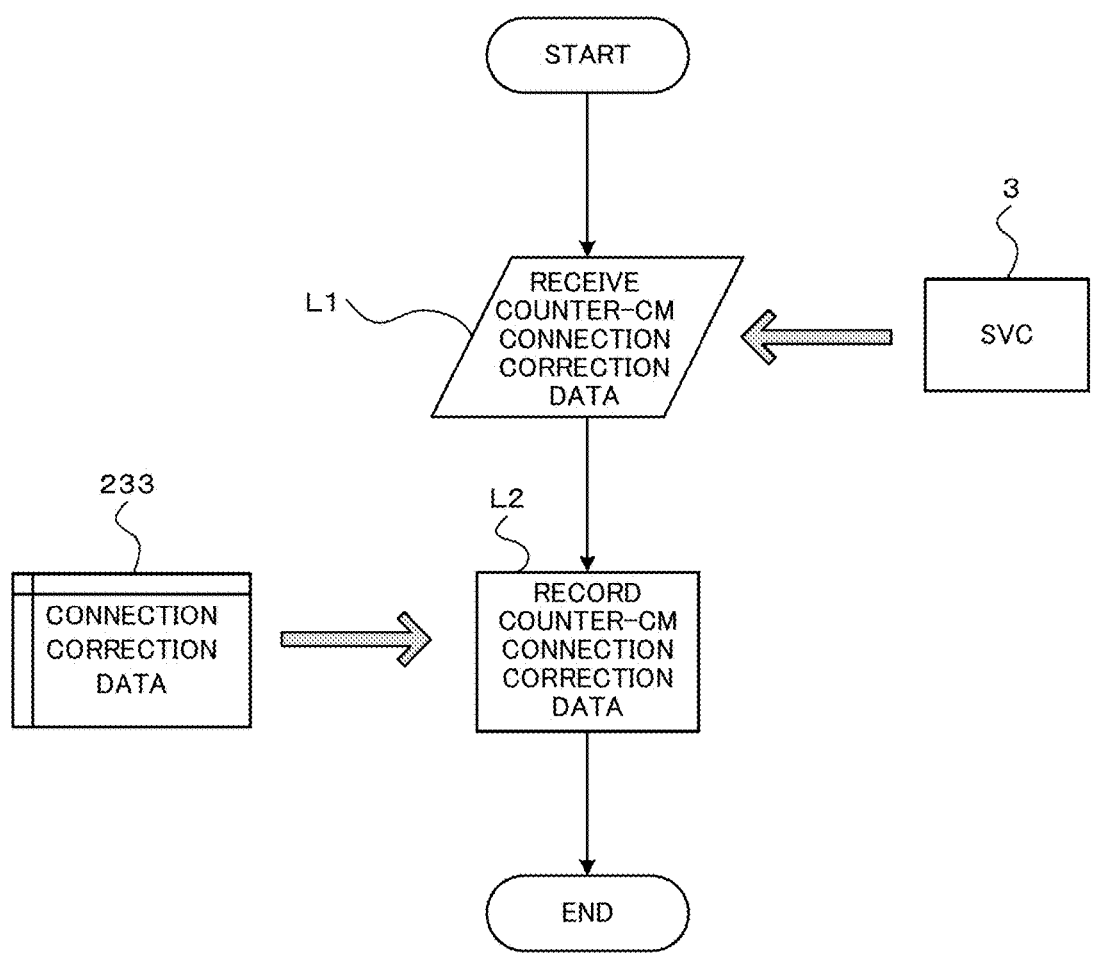
FIG. 22 is a flowchart illustrating processing by a connection correction data managing unit in a CM in the storage apparatus as one example of the second embodiment.

Next, processing by a connection correction data managing unit 225 in a CM 2 in the storage apparatus 1 as one example of the second embodiment will be described with reference to a flowchart (Steps L1-L2) depicted in FIG. 22.

When connection correction data 343 is sent from the connection correction data sending unit 329 in the SVC 3, the connection correction data managing unit 225 receives the connection correction data 343 (Step L1) and stores the received connection correction data 343 in a predetermined storage area in the memory 23, as connection correction data 233 (Step L2) and the processing ends.

Figure 23:
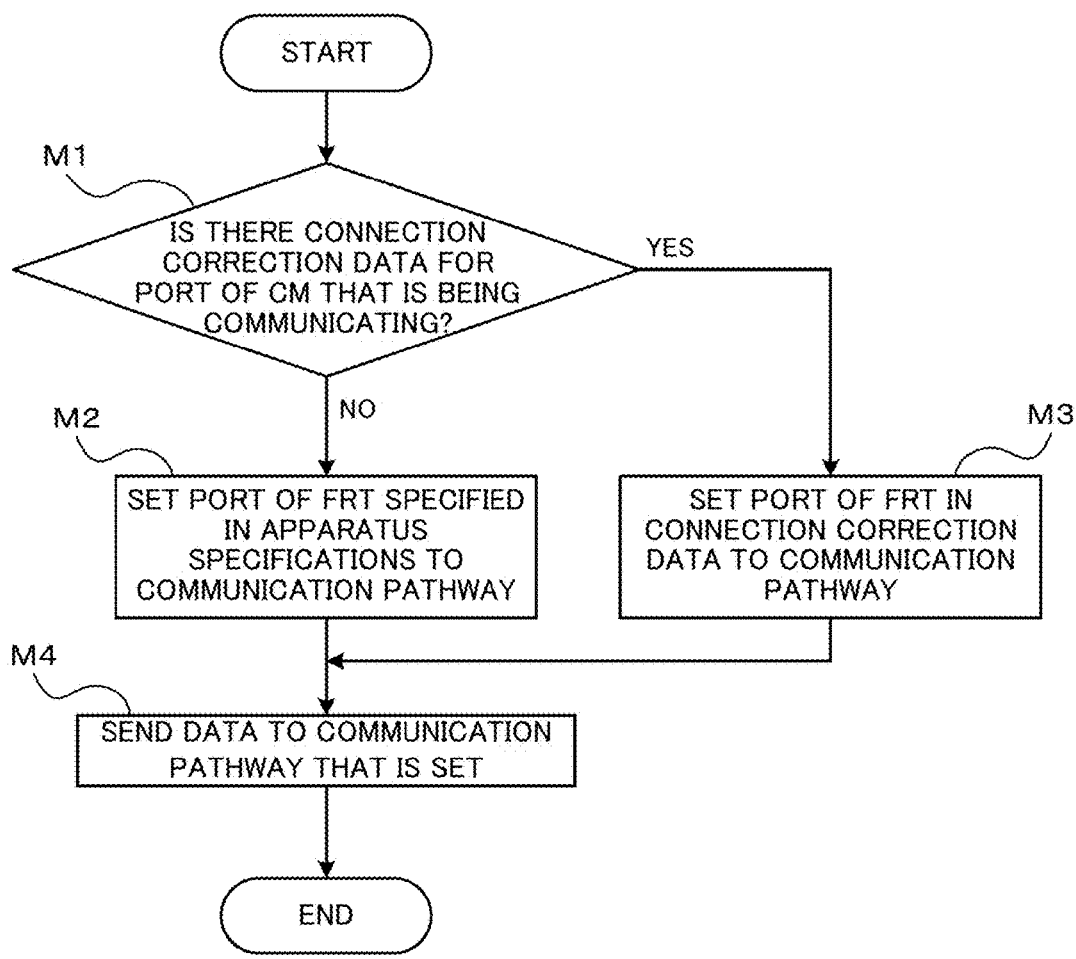
FIG. 23 is a flowchart illustrating processing by a communication controlling unit in a CM in the storage apparatus as one example of the second embodiment.

Next, processing by a communication controlling unit 226 in a CM 2 in the storage apparatus 1 as one example of the second embodiment will be described with reference to a flowchart (Steps M1-M4) depicted in FIG. 23.

The communication controlling unit 226 looks up the connection correction data 233, and checks whether or not a port (the connector 21) in the CM 2 of a communication counterpart is registered (Step M1).

If the connector 21 in the CM 2 of the communication counterpart is not registered in the connection correction data 233 (refer to the NO route from Step M1), the communication controlling unit 226 sets a port (the connector 41) in the FRT 4 specified in the apparatus specifications, as a communication pathway (Step M2).

Otherwise, if the connector 21 in the CM 2 of the communication counterpart is registered in the connection correction data 233 (refer to the YES route from Step M1), the communication controlling unit 226 sets, as a communication pathway, the port (the connector 41) in the FRT 4 that is registered in the connection correction data 343, corresponding to the connector 21 in the CM 2 of the communication counterpart (Step M3).

Thereafter, the communication controlling unit 226 sends data to the communication pathway that is set (Step M4), and the processing ends.

Figure 24:
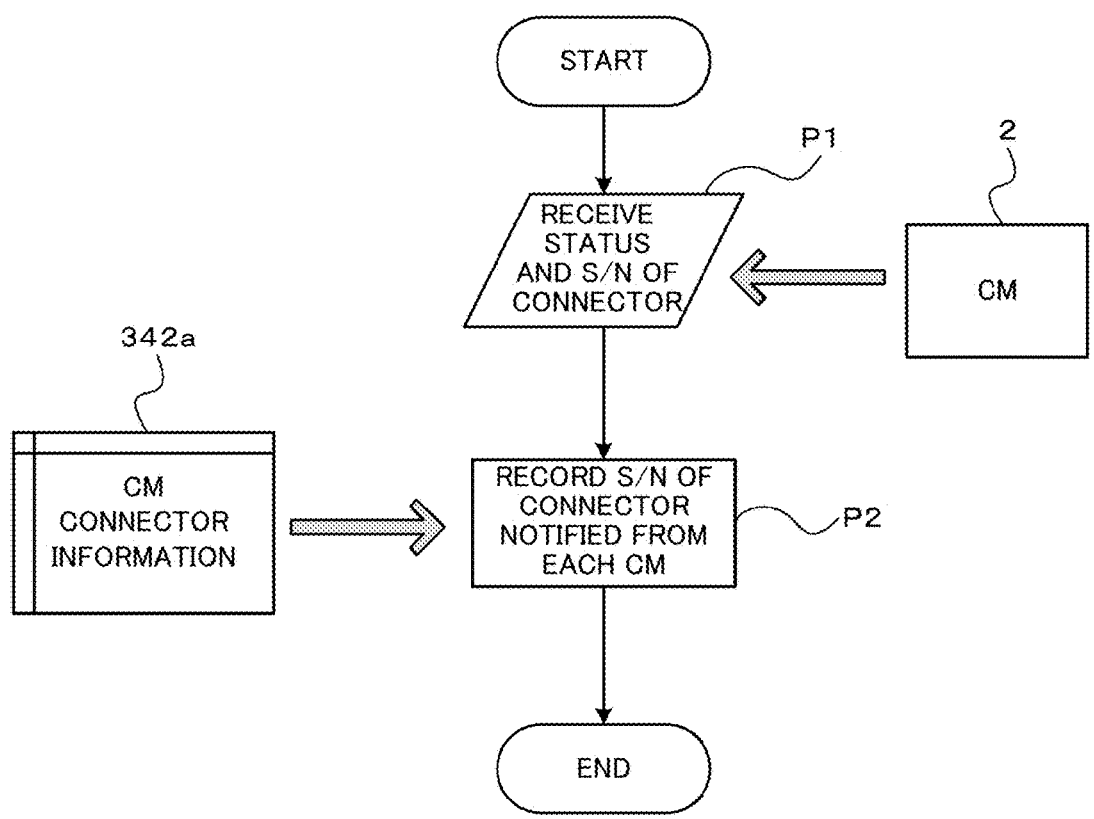
FIG. 24 is a flowchart illustrating processing by a connector status managing unit in an SVC in the storage apparatus as one example of the second embodiment.

Next, processing by the connector status managing unit 324 in the SVC 3 in the storage apparatus 1 as one example of the second embodiment will be described with reference to a flowchart (Steps P1-P2) depicted in FIG. 24.

The connector status managing unit 324 receives the serial numbers of all of the connectors 21 in each CM 2, which are sent from a connector status notifying unit 224 in the each CM 2 (step P1).

The connector status managing unit 324 registers the received serial numbers to CM connector information 342a (Step P2), and the processing ends.

Figure 25:
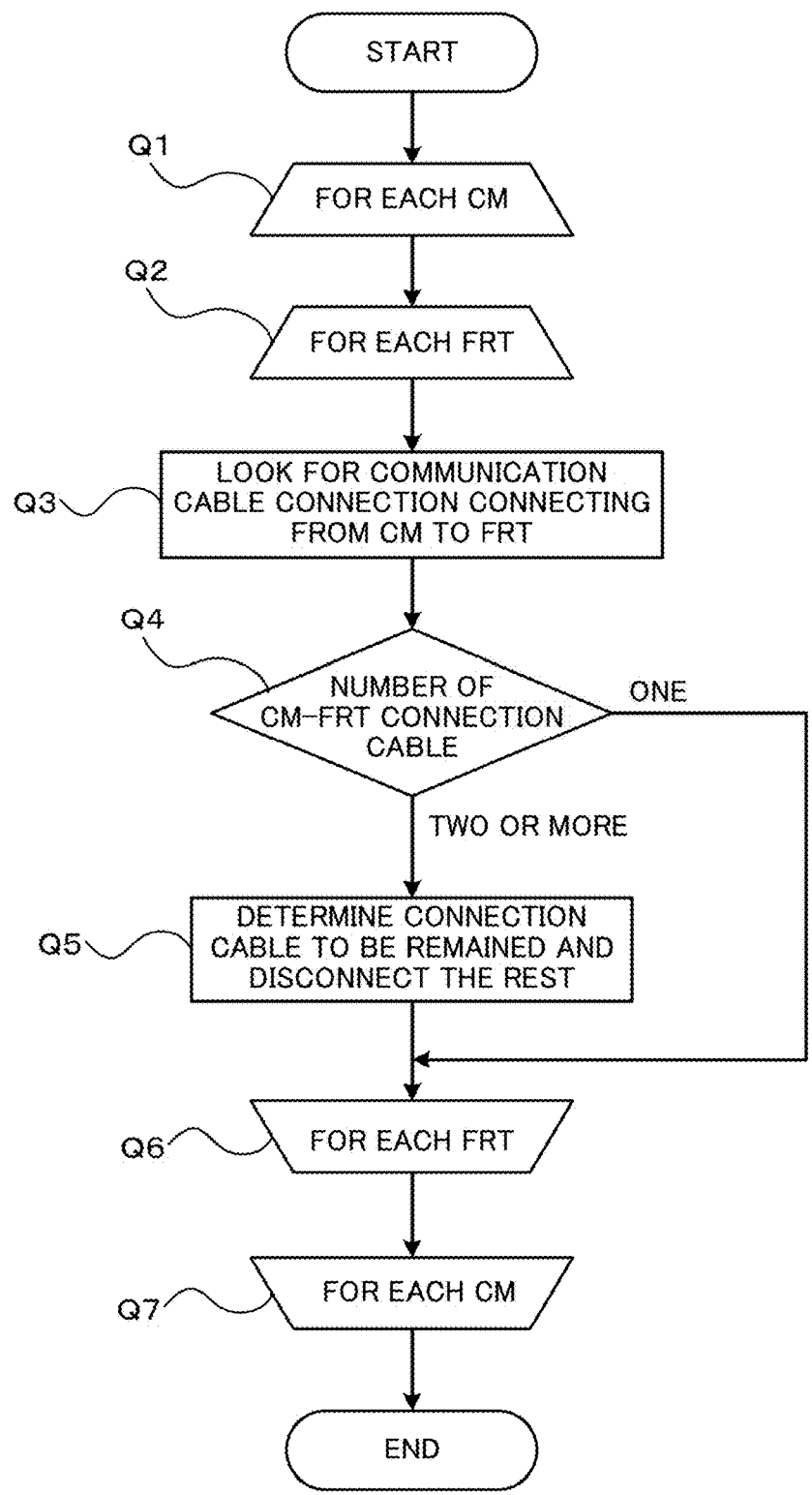
FIG. 25 is a flowchart illustrating processing by a pathway sorting out unit in the SVC in the storage apparatus as one example of the second embodiment.

Next, processing by the pathway sorting out unit 327 in the SVC 3 in the storage apparatus 1 as one example of the second embodiment will be described with reference to a flowchart (Steps Q1-Q7) depicted in FIG. 25.

In Step Q1, loop processing where the controls to Step Q6 are repeated on all of the CMs 2 present in the storage apparatus 1 is initiated.

In Step Q2, loop processing where the controls to Step Q5 are repeated on all of the FRTs 4 present in the storage apparatus 1 is initiated.

In Step Q3, the pathway sorting out unit 327 searches for communication cables 8 connecting from a CM 2 to a FRT 4.

In Step Q4, the pathway sorting out unit 327 determines the number of cables connecting a CM 2 and a FRT 4. Specifically, the pathway sorting out unit 327 checks whether there is any redundant connection between one CM 2 and one FRT 4.

If there are two or more cables connecting a CM 2 and a FRT 4 (refer to "TWO OR MORE" route from Step Q4), in Step Q5, the pathway sorting out unit 327 selects one cable connection to be used, and disconnects the port in the FRT 4 for the other connections.

Otherwise, if there is one cable connecting a CM 2 and a FRT 4 (refer to "ONE" route from Step Q4), Step Q5 is skipped.

Thereafter, the control proceeds to Step Q6. In Step Q6, loop end processing corresponding to Step Q2 is performed. Here, if the processing is completed for all of the FRTs 4, the control proceeds to Step Q7.

In Step Q7, loop end processing corresponding to Step Q1 is performed. Here, if the processing is completed for all of the CMs 2, this flow ends.

Figure 26:
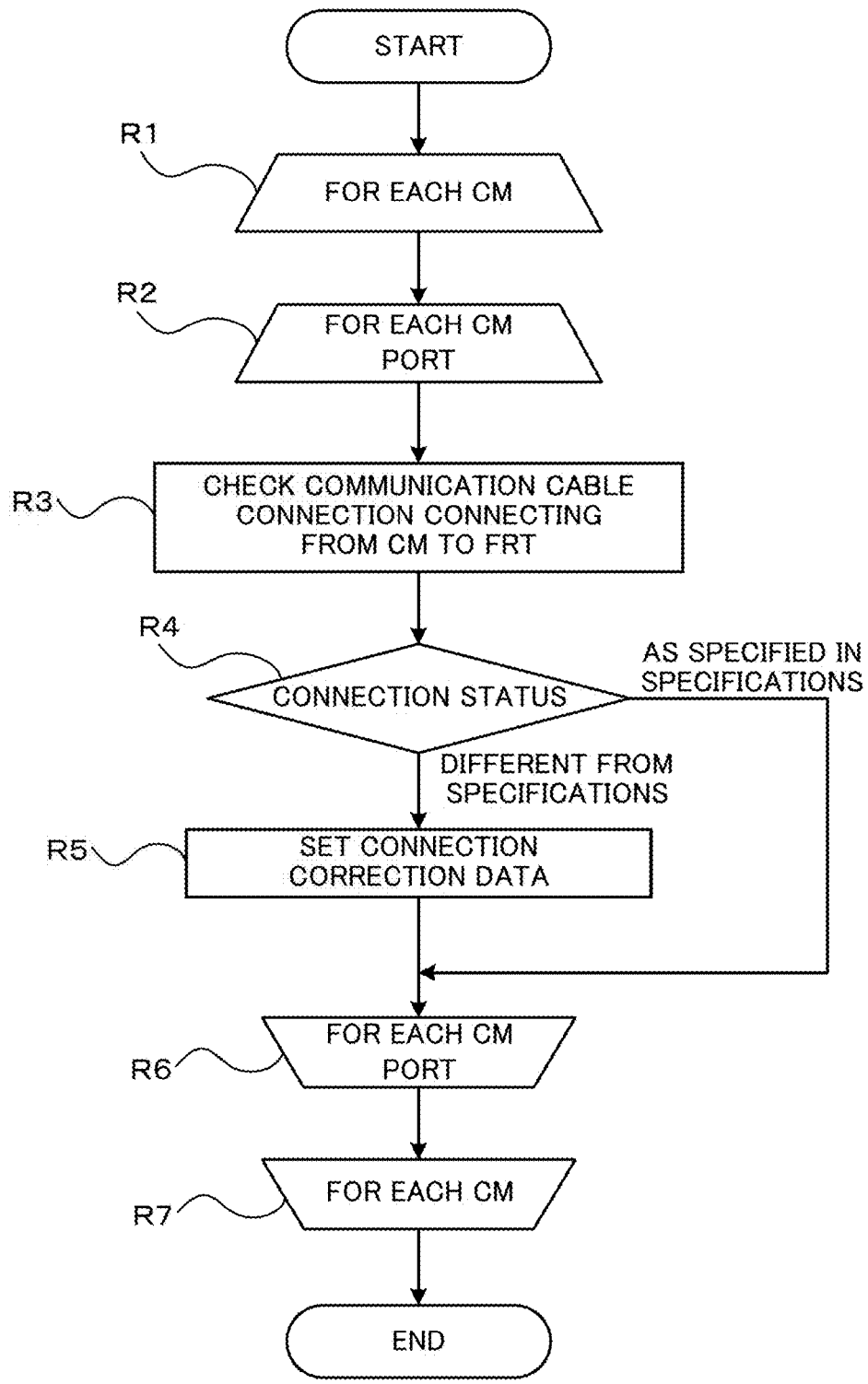
FIG. 26 is a flowchart illustrating processing by a connection correction data generating unit in the SVC in the storage apparatus as one example of the second embodiment.

Next, processing by the connection correction data generating unit 325 in the SVC 3 in the storage apparatus 1 as one example of the second embodiment will be described with reference to a flowchart (Steps R1-R7) depicted in FIG. 26.

In Step R1, loop processing where the controls to Step R6 are repeated on all of the CMs 2 present in the storage apparatus 1 is initiated.

In Step R2, loop processing where the controls to Step R5 are repeated on all of the connectors 21 (port) present in the CM 2 is initiated.

In Step R3, the connection correction data generating unit 325 finds cable connections connecting from a CM 2 to an FRT 4, and in Step R4, determines whether or not the cable connection is compliant with the apparatus specifications. If it is determined that the cable connection is different from the apparatus specifications (refer to the "DIFFERENT FROM SPECIFICATIONS" route from Step R4), in Step R5, the connection correction data generating unit 325 identifies that combination of the connector 21 in the CM 2 and the connector 41 in the FRT 4 and registers it to the connection correction data 343.

Otherwise, if the cable connection is as specified in the apparatus specifications (refer to the "AS SPECIFIED IN SPECIFICATIONS" route from Step R4), Step R5 is skipped.

Thereafter, the control proceeds to Step R6. In Step R6, loop end processing corresponding to Step R2 is performed. Here, if the processing is completed for all of the ports (the connectors 21) in the CMs 2, the control proceeds to Step R7.

In Step R7, loop end processing corresponding to Step R1 is performed. Here, if the processing is completed for all of the CMs 2, this flow ends.

Next, processing by the connection correction data sending unit 329 in the SVC 3 in the storage apparatus 1 as one example of the second embodiment will be described with reference to a flowchart (Steps S1-S4) depicted in FIG. 27.

The connection correction data sending unit 329 sets a target CM 2 to which connection correction data 343 is to be sent (Step S1). The connection correction data 343 is to be sent to all of the CMs 2 in the storage apparatus 1, and hence the connection correction data sending unit 329 sequentially selects a CM 2 to which connection correction data 343 has not been sent, among all of the CMs 2, as a target.

The connection correction data sending unit 329 sends the connection correction data 343 that is updated in the SVC 3, to the CM 2 set in Step S1, through the monitor interface cable 70 (Step S2).

Thereafter, the connection correction data sending unit 329 looks for a next target CM 2 (Step S3). The connection correction data sending unit 329 checks whether or not there is any CM 2 to which connection correction data 343 has not been sent (Step S4). If there is a CM 2 to which connection correction data 343 has not been sent (refer to the YES route from Step S4), the control returns to Step S1. Otherwise, if there is no CM 2 to which connection correction data 343 has not been sent (refer to the NO route from Step S4), the processing ends.

(c) Advantages

As described above, in accordance with the storage apparatus 1 as one example of the second embodiment, if there is an incorrect connection different from the apparatus specifications, among connections with the communication cables 8 between the CMs 2 and the FRTs 4, the connection correction data generating unit 325 generates the connection correction data 343, reflecting the connected status of the communication cable 8.

In a CM 2, when data is sent to the connector 21 in the CM 2 registered in the connection correction data 233, the communication controlling unit 226 selects the connector 41 in the FRT 4 that is registered in the connection correction data 233 in combination with the counterpart connector 21, as a communication pathway, and sends data.

Thereby, even if a communication cable 8 is not properly connected between a CM 2 and an FRT 4, data transmission can be achieved and the storage apparatus 1 can be operated in a stable manner.

When the connection correction data generating unit 325 determines a communication cable 8 as being incorrectly connected, the combination of the connector 21 in the CM 2 and the connector 41 in the FRT 4 is identified for the determined incorrect connection and is registered to the connection correction data 343. Thereby, the connection correction data 343 that reflects actual pathways connected through the communication cable 8 is generated, and data can be sent in a reliable manner.

When multiple communication cables 8 are connected from one CM 2 to the same the FRT 4, the pathway sorting out unit 327 eliminates redundant connections by disconnects all of the redundant communication cables 8, except for a single communication cable 8.

In response to the disconnection of the port in the FRT 4, a control program handles it as a line fault in the CM 2. Thereby, the system administrator and other users can be notified of an incorrect wiring between the CM 2 and the FRT 4.

(C) Miscellaneous

Note that the program for implementing the functions as the CM number providing unit 321, the connector checking units 322 and 322a, the connector status notifying unit 323, the connector status managing unit 324, the connection correction data generating unit 325, the startup controlling unit 326, the pathway sorting out unit 327, and the connection correction data sending unit 329, of the SVC 3 in the storage apparatus 1, in accordance with the first and second embodiments described above, is provided in the form of programs recorded on a computer-readable recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW, HD DVD), a Blu-ray disk, a magnetic disk, an optical disk, a magneto-optical disk, or the like. The computer reads the program out of the recording medium and transfers the program to an internal or an external storage device for use. Alternatively, the program may be recorded on a storage unit (storage medium), for example, a magnetic disk, an optical disk, a magneto-optical disk, or the like, and the program may be provided from the storage unit to the computer through a communication path.

Upon embodying the functions as the CM number providing unit 321, the connector checking units 322 and 322a, the connector status notifying unit 323, the connector status managing unit 324, the connection correction data generating unit 325, the startup controlling unit 326, the pathway sorting out unit 327, and the connection correction data sending unit 329, a program stored in an internal storage apparatus (the RAM or the ROM in the memory 34 in the present embodiment) is executed by a microprocessor of the computer (the MPU 32 in the present embodiment). In this case, the computer may alternatively read a program stored in the storage medium for executing it.

In addition, the program for implementing the functions as the CM number recognizing unit 221, the connector checking units 222 and 222a, the connection normality determining unit 223, the connector status notifying unit 224, the connection correction data managing unit 225, and the communication controlling unit 226, of a CM 2 in the storage apparatus 1 in accordance with the first and second embodiments described above, is provided in the form of programs recorded on a computer-readable recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW, HD DVD), a Blu Ray disk, a magnetic disk, an optical disk, a magneto-optical disk, or the like. The computer reads the program out of the recording medium and transfers the program to an internal or an external storage device for use. Alternatively, the program may be recorded on a storage unit (storage medium), for example, a magnetic disk, an optical disk, a magneto-optical disk, or the like, and the program may be provided from the storage unit to the computer through a communication path.

Upon embodying the functions as the CM number recognizing unit 221, the connector checking units 222 and 222a, the connection normality determining unit 223, the connector status notifying unit 224, the connection correction data managing unit 225, and the communication controlling unit 226, a program stored in an internal storage apparatus (the RAM or the ROM in the memory 34 in the present embodiment) is executed by a microprocessor of the computer (the MPU 32 in the present embodiment). In this case, the computer may alternatively read a program stored in the storage medium for executing it.

The disclosed technique is not limited to the above-described embodiments, and various modifications may be made to the extent not departing from the spirit of the present embodiment. The configurations and processing in these embodiments may be omitted or selected where deemed necessary, or may be suitably combined.

For example, the number of CMs 2 and the number of FRTs 4 provided in the storage apparatus 1 is not limited to those in the above-described embodiments and various modifications may be made.

In addition, similarly, the number of connector 21 provided in each CM 2 or the number of connectors 41 provided in each FRT 4 is also not limited to those in the above-described embodiments and various modifications may be made.

Furthermore, while an example where the communication cables 8 are PCIe cables and communications are performed between the CMs 2 and the FRTs 4 in accordance with the PCIe has been described in the above-described embodiments, this is not limiting and this technique may be applied to communications compliant with other standards than the PCIe.

In addition, while an example of the communication cables 8 connecting the CMs 2 and the FRTs 4 in the storage apparatus 1 has been described in the above-described embodiments, this is not limiting. For example, this technique may be applied to computer systems, such as those in which multiple information processing apparatuses are connected, and various modifications may be made.

Those skilled in the art can practice and manufacture the present embodiments by referring to the above disclosure.

In accordance with one embodiment, incorrect connections of communication cables can be easily found.

All examples and conditional language recited herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A communication system comprising:
a communication apparatus comprising a plurality of first connectors;
a controlling apparatus that comprises a plurality of second connectors and is connected to the communication apparatus through a plurality of communication cables; and
a management apparatus that is connected to the communication apparatus and the controlling apparatus;
the management apparatus comprises:
an apparatus identifier setting unit that sets an apparatus identifier for identifying the controlling apparatus, the controlling apparatus being connected to the management apparatus via a communication path that is different from the communication cables;
a first gathering unit that gathers a first identifier that is a serial number of each of the plurality of communication cables coupled to the plurality of first connectors of the communication apparatus; and
the controlling apparatus comprises:
an apparatus identifier obtaining unit that obtains the apparatus identifier from the apparatus identifier setting unit via the communication path;
a second gathering unit that gathers a second identifier that is a serial number of each of the plurality of communication cables coupled to the plurality of second connectors of the controlling apparatus; and
a connection normality determining unit that determines whether or not the communication cables that connect between the controlling apparatus and the communication apparatus are connected properly, by comparing the first identifiers with the second identifiers,
the connection normality determining unit obtains the first identifier for the respective communication cables coupled to the first connectors which apparatus specifications specify to be connected to the second connectors from among the first identifiers gathered by the first gathering unit, by referring to the apparatus specifications specifying respective combinations of the first connectors and the second connectors of the control apparatus associated with the apparatus identifier obtained by the apparatus identifier obtaining unit, when the second identifier of each of the plurality of communication cables matches the first identifier of the communication cable, the connection normality determining unit determines that the second connector coupled to the communication cable is correctly connected, and when the second identifier of each of the plurality of communication cables does not match the first identifier of the communication cable, the connection normality determining unit determines that the second connector coupled to the communication cable is not correctly connected.

2. The communication system according to claim 1, wherein the first identifiers are managed in the management apparatus, and the second identifiers are managed in the controlling apparatus.

3. A communication system comprising;
a communication apparatus comprising a plurality of first connectors;
a controlling apparatus that comprises a plurality of second connectors and is connected to the communication apparatus through a plurality of communication cables; and
a management apparatus that is connected to the communication apparatus and the controlling apparatus, the management apparatus comprises:
an apparatus identifier setting unit that sets an apparatus identifier for identifying the controlling apparatus, the controlling apparatus being connected to the management apparatus via a communication path that is different from the communication cables; and
a first gathering unit that gathers first identifiers that are serial numbers of the communication cables coupled to the plurality of first connectors of the communication apparatus; and
the controlling apparatus comprises:
an apparatus identifier obtaining unit that obtains the apparatus identifier from the apparatus identifier setting unit via the communication path; and
a second gathering unit that gathers the second identifiers that are serial numbers of the communication cables coupled to the plurality of second connectors of the controlling apparatus; and
the management apparatus further comprises a connection correction information generating unit that generates connection correction information identifying combinations of the first connectors and the second connectors to be connected to the first connectors, when another first connectors is connected to the second connectors of the controlling apparatus, the another first connectors are not the first connectors to be connected to the second connectors, by comparing the first identifiers with second identifiers, the first identifiers identifying the respective communication cables coupled to the first connectors which apparatus specifications specify to be connected to the second connector from among the first identifiers gathered by the first gathering unit, by referring to the apparatus specifications specifying respective combinations of the first connectors and the second connectors of the control apparatus associated with the apparatus identifier obtained by the apparatus identifier obtaining unit, and determining statuses indicating the way that the first connectors are connected to the second connectors through the communication cables, and
the controlling apparatus further comprises a communication controlling unit that sets the first connectors to be connected to the second connectors as a communication pathway and performs a data communication between the communication apparatus and the controlling apparatus, based on the connection correction information.

4. The communication system according to claim 3, further comprising a pathway sorting out unit that, in a case where the controlling apparatus and the communication apparatus are connected via a plurality of pathways through a plurality of communication cables in a redundant manner, disables all pathways among the redundant pathways, except for one pathway.

5. The communication system according to claim 3, wherein the first identifiers are managed in the management apparatus, and the second identifiers are managed in the controlling apparatus.

6. A management apparatus that manages, in a communication system comprising a communication apparatus comprising a plurality of first connectors; a controlling apparatus that comprises a plurality of second connectors and is connected to the communication apparatus through a plurality of communication cables; and the management apparatus is connected to the communication apparatus and the controlling apparatus, and provides for communications between the communication apparatus and the controlling apparatus, the management apparatus comprising:
- an apparatus identifier setting unit that sets an apparatus identifier for identifying the controlling apparatus, the controlling apparatus being connected to the management apparatus via a communication path that is different from the communication cables;
- a first gathering unit that gathers first identifiers that are serial numbers of the communication cables coupled to the plurality of first connectors of the communication apparatus;
- an obtaining unit that obtains second identifiers that are serial numbers of the communication cables coupled to the plurality of second connectors of the controlling apparatus;
- a connection correction information generating unit that generates connection correction information identifying combinations of the first connectors and the second connectors to be connected to the first connectors, when another first connectors is connected to the second connectors of the controlling apparatus, the another first connectors are not the first connectors to be connected to the second connectors, by comparing the first identifiers with second identifiers, the first identifiers identifying the respective communication cables coupled to the first connectors which apparatus specifications specify to be connected to the second connector from among the first identifiers gathered by the first gathering unit, by referring to the apparatus specifications specifying respective combinations of the first connectors and the second connectors of the control apparatus associated with the apparatus identifier obtained by the apparatus identifier obtaining unit, and determining statuses indicating the way that the first connectors are connected to the second connectors through the communication cables; and
- a connection correction information sending unit that sends the generated connection correction information to the controlling apparatus.

7. The management apparatus according to claim 6, further comprising a pathway sorting out unit that, in a case where the controlling apparatus and the communication apparatus are connected via a plurality of pathways through a plurality of communication cables in a redundant manner, disables all pathways among the redundant pathways, except for one pathway.

8. The management apparatus according to claim 6, wherein the first identifiers are managed in the management apparatus, and the second identifiers are managed in the controlling apparatus.

9. A controlling apparatus, in a communication system comprising a communication apparatus comprising a plurality of first connectors; the controlling apparatus comprises a plurality of second connectors and is connected to the communication apparatus through a plurality of communication cables; and a management apparatus that is connected to the communication apparatus and the controlling apparatus, the controlling apparatus performing a process comprising:
- obtaining unit that obtains the apparatus identifier from the apparatus identifier setting unit via the communication path;
- gathering a second identifier that is a serial number of each of the plurality of communication cables coupled to the plurality of second connectors of the controlling apparatus;
- determining whether the communication cables that connect between the controlling apparatus and the communication apparatus are connected properly, by obtaining the first identifier for the respective communication cables coupled to the first connectors which apparatus specifications specify to be connected to the second connector from among the first identifiers gathered by the controlling apparatus, by referring to the apparatus specifications specifying respective combinations of the first connectors and the second connectors of the control apparatus associated with the apparatus identifier, and comparing the first identifier with the second identifiers;
- determining, when the second identifier of each of the plurality of communication cables matches the first identifier of the communication cable, that the second connector coupled to the communication cable is correctly connected; and
- determining, when the second identifier of each of the plurality of communication cables does not match the first identifier of the communication cable, that the second connector coupled to the communication cable is not correctly connected.

10. The controlling apparatus according to claim 9, wherein the first identifiers are managed in the management apparatus, and the second identifiers are managed in the controlling apparatus.

* * * * *